United States Patent
Moore et al.

(10) Patent No.: US 7,269,604 B2
(45) Date of Patent: Sep. 11, 2007

(54) SYSTEM OF AND METHOD FOR TRANSPARENT MANAGEMENT OF DATA OBJECTS IN CONTAINERS ACROSS DISTRIBUTED HETEROGENOUS RESOURCES

(75) Inventors: Reagan W. Moore, San Diego, CA (US); Arcot Rajasekar, Del Mar, CA (US); Michael Y. Wan, San Diego, CA (US)

(73) Assignee: General Atomics, San Diego, CA (US)

( * ) Notice: Subject to any disclaimer, the term of this patent is extended or adjusted under 35 U.S.C. 154(b) by 570 days.

(21) Appl. No.: 10/693,599

(22) Filed: Oct. 24, 2003

(65) Prior Publication Data

US 2004/0133609 A1 Jul. 8, 2004

Related U.S. Application Data

(62) Division of application No. 09/559,862, filed on Apr. 27, 2000, now Pat. No. 6,678,700.

(51) Int. Cl.
*G06F 17/40* (2006.01)
(52) U.S. Cl. .......... 707/200; 707/10; 707/103 R; 709/201
(58) Field of Classification Search .......... 707/2, 707/8, 10, 103 R, 200, 104.1, 201, 202, 204; 709/201–203, 213, 216, 220, 224, 227, 239; 710/100; 714/1, 6; 718/102
See application file for complete search history.

(56) References Cited

U.S. PATENT DOCUMENTS

| | | | |
|---|---|---|---|
| 5,325,524 A | 6/1994 | Black et al. ............. | 707/10 |
| 5,329,619 A | 7/1994 | Pagé et al. ............. | 709/203 |
| 5,345,586 A | 9/1994 | Hamala et al. .......... | 707/10 |
| 5,483,652 A | 1/1996 | Sudama et al. .......... | 707/10 |
| 5,485,606 A | 1/1996 | Midgdey et al. ......... | 707/10 |
| 5,491,796 A | 2/1996 | Wanderer et al. ........ | 709/224 |
| 5,495,607 A | 2/1996 | Pisello et al. ............ | 707/10 |
| 5,506,984 A | 4/1996 | Miller ................... | 707/10 |
| 5,596,744 A | 1/1997 | Dao et al. ............... | 707/10 |
| 5,606,693 A | 2/1997 | Nilsen et al. ............ | 707/10 |
| 5,721,916 A | 2/1998 | Pardikar ................ | 707/201 |
| 5,727,145 A * | 3/1998 | Nessett et al. ........... | 726/5 |

(Continued)

OTHER PUBLICATIONS

Brochure on *The Spring Implementation Conference*; by *The Data Warehousing Institute™*, 849-J Quince Orchard Blvd., Gaithersburg, MD 20878, May 7-12, 2000, 3pp.

(Continued)

*Primary Examiner*—Shahid Al Alam
(74) *Attorney, Agent, or Firm*—Howrey LLP

(57) ABSTRACT

A system of and method for maintaining data objects in containers across a network of distributed heterogeneous resources in a manner which is transparent to a client. A client request pertaining to containers is resolved by querying meta data for the container, processing the request through one or more copies of the container maintained on the system, updating the meta data for the container to reflect any changes made to the container as a result processing the re quest, and, if a copy of the container has changed, changing the status of the copy to indicate dirty status or synchronizing the copy to one or more other copies that may be present on the system.

17 Claims, 27 Drawing Sheets

U.S. PATENT DOCUMENTS

| | | | |
|---|---|---|---|
| 5,727,203 A | 3/1998 | Hapner et al. | 707/103 R |
| 5,737,607 A * | 4/1998 | Hamilton et al. | 719/316 |
| 5,793,965 A * | 8/1998 | Vanderbilt et al. | 709/203 |
| 5,809,507 A | 9/1998 | Cavanaugh, III | 707/103 R |
| 5,819,275 A | 10/1998 | Badger et al. | 707/100 |
| 5,819,296 A | 10/1998 | Anderson et al. | 707/204 |
| 5,832,500 A | 11/1998 | Burrows | 707/103 R |
| 5,832,506 A | 11/1998 | Kuzma | 707/200 |
| 5,864,843 A | 1/1999 | Cariño, Jr. et al. | 707/4 |
| 5,864,864 A * | 1/1999 | Lerner | 707/102 |
| 5,870,742 A | 2/1999 | Chang et al. | 707/8 |
| 5,884,310 A | 3/1999 | Brichta et al. | 707/10 |
| 5,907,675 A * | 5/1999 | Aahlad | 709/203 |
| 5,940,827 A | 8/1999 | Hapner et al. | 707/8 |
| 5,943,666 A | 8/1999 | Kleewein et al. | 707/2 |
| 6,003,044 A | 12/1999 | Pongracz et al. | 707/204 |
| 6,009,428 A | 12/1999 | Kleewein et al. | 707/10 |
| 6,014,667 A | 1/2000 | Jenkins et al. | 707/10 |
| 6,016,495 A | 1/2000 | McKeehan et al. | 707/103 R |
| 6,178,440 B1 | 1/2001 | Foster et al. | 709/201 |
| 6,253,253 B1 * | 6/2001 | Mason et al. | 719/315 |
| 6,336,147 B1 * | 1/2002 | Brownell et al. | 719/310 |
| 6,349,342 B1 * | 2/2002 | Menges et al. | 719/316 |
| 6,601,195 B1 * | 7/2003 | Chirashnya et al. | 714/43 |

OTHER PUBLICATIONS

*Briefing—The Age of Petabytes, Red Herring,* Mar. 2000, selected pages (42 total).

Baru, Chaitanya et al.; *The SDSC Storage Resource Broker*; Online? 1998, NEC Research Institute Research Index, pp. 1-12, at http://citeseer.nj.nec.com/baru98sdsc.html.

Moore, Reagan et al.; Collection-Based Persistent Digital Archives—Part 1, D-Lib Magazine, vol. 6, No. 3, pp. 1-13, Mar. 2000.

* cited by examiner

| CONTAINER | DATA OBJECTS | SIZE | OFFSET |
|---|---|---|---|
| FOO_BAR | Q | 58 | 0 |
|  | R | 1024 | 58 |
|  | S...X | 95...12 | 1082...2000 |
|  | Y | 34 | 2012 |
|  | Z | 45 | 2046 |
| FOO_BAR1 | D | 67 | 0 |
|  | E | 54 | 67 |
|  | F | 34 | 121 |
|  | G | 61 | 155 |

FIGURE 15a

| CONTAINER | RESOURCES | FLAGS |
|---|---|---|
| FOO_BAR | 111a-CACHE<br>111b-ARCHIVE<br>111c-CACHE<br>111d-ARCHIVE |  |
| FOO_BAR1 |  |  |

FIGURE 15b

SYSTEM OF AND METHOD FOR TRANSPARENT MANAGEMENT OF DATA OBJECTS IN CONTAINERS ACROSS DISTRIBUTED HETEROGENOUS RESOURCES

This is a division of U.S. patent application Ser. No. 09/559,862, filed Apr. 27, 2000, now U.S. Pat. No. 6,678,700, which is hereby incorporated by reference herein as though set forth in full.

The U.S. Government has a paid-up license in this invention and the right in limited circumstances to require the patent owner to license others on reasonable terms as provided for by the terms of W7405-ENG-48 awarded by Department of Energy.

BACKGROUND OF THE INVENTION

1. Field of the Invention

This invention generally relates to managing data objects in a distributed, heterogenous network environment, and, more specifically, to managing aggregate forms of such data objects across distributed heterogenous resources such that the aggregate forms of the data objects are transparent to the user.

2. Background

Many applications require access to data objects distributed across heterogeneous network resources. Examples of such data objects include office automation products, drawings, images, and electronic E-mail. Other examples include scientific data related to digital images of cross-sections of the human brain, digital sky survey image files, issued patents, protein structures, and genetic sequences. In a typical scenario, data objects are generated at multiple sites distributed around the country. Data objects related to a common topic or project are organized into a collection for access. If the data sets are located at different sites, efficient access usually requires gathering the data sets at a common location. The resulting collection must then be archived to guarantee accessibility in the future. The management of data objects is typically complicated by the fact that the data objects may be housed in diverse and heterogeneous computer-based systems, including database management systems, archival storage systems, file systems, etc. To efficiently make use of these data objects, a unified framework is needed for accessing the data objects from the numerous and diverse sources.

Conventional systems for managing data include those depicted in U.S. Pat. Nos. 6,016,495; 5,345,586; 5,495,607; 5,940,827; 5,485,606; 5,884,310; 5,596,744; 6,014,667; 5,727,203; 5,721,916; 5,819,296; and 6,003,044.

U.S. Pat. No. 6,016,495 describes an object-oriented framework for defining storage of persistent objects (objects having a longer life than the process that created it). The framework provides some core functionalities, defined in terms of several classes (e.g., Access Mode, CachedEntity Instance, TransactionManager, DistributedThreadContext, and ConnectionManager) and user extensible functionalities that can be modified to provide access according to the persistent storage being used. The concept of a "container" as discussed in the patent simply refers to a logical grouping of class structures in a persistent storage environment, and is different from the concept of "container" of the subject invention as can be seen from the embodiment, later described.

U.S. Pat. No. 5,345,586 describes a data processing system consisting of multiple distributed heterogeneous databases. The system uses a global data directory to provide a logical data model of attributes and domains (type, length, scale, precision of data) and a mapping (cross-reference) to physical attributes (and tables) residing in multiple (possibly remote) databases. The global data directory stores route (or location) information about how to access the (remote) databases. The cross-reference information is used to convert the values from the physical databases into a consistent and uniform format.

U.S. Pat. No. 5,495,607 describes a network administrator system that uses a virtual catalog to present an overview of all the file in the distributed system. It also uses a rule-based monitoring system to monitor and react to contingencies and emergencies in the system.

U.S. Pat. No. 5,940,827 describes a method by which database systems manage transactions among competing clients who seek to concurrently modify a database. The method is used for maintaining cache coherency and for copying the cache into the persistent state.

U.S. Pat. No. 5,485,606 describes a method and system for backing up files into an archival storage system and for retrieving them back into the same or different operating system. To facilitate this function, the system writes a directory file, for each data file, containing information that is specific to the operating system creating the file as well as information common to other operating systems that can be utilized when restoring the file later.

U.S. Pat. No. 5,884,310 describes a method for integrating data sources using a common database server. The data sources are organized using disparate formats and file structures. The method extracts and transforms data from the disparate data sources into a common format (that of the common database server) and stores it in the common database for further access by the user.

U.S. Pat. No. 5,596,744 describes a method for sharing of information dispersed over many physical locations and also provides a common interface for adapting to incompatible database systems. The patent describes a Federated Information Management (FIM) architecture that provides a unified view of the databases to the end user and shields the end user from knowing the exact location or distribution of the underlying databases.

The FIM uses a Smart Data Dictionary (SDD) to perform this integration. The SDD contains meta-data such as the distribution information of the underlying databases, their schema and the FIM configuration. The SDD is used to provide information for parsing, translating, optimizing and coordinating global and local queries issued to the FIM.

The SDD uses a Cache Memory Management (CMM) to cache meta-data from SDD into local sites for speeding up processing. The patent describes several services that use the FIM architecture. The patent also describes methods for SQL query processing (or DBMS query processing).

U.S. Pat. No. 6,014,667 describes a system and method for caching directory information that may include identification information, location network addresses and replica information for objects stored in a distributed system. These directory caches are located locally and used for speeding up access since directory requests need not be referred to a remote site. The patent deals with caching of directory information in order to reduce traffic. The patent also allows for replicated data addresses to be stored in the cache.

U.S. Pat. No. 5,727,203 is similar to U.S. Pat. No. 5,940,827 but is restricted to object-oriented databases.

U.S. Pat. No. 5,721,916 describes a method and system for making available a shadow file system for use when a computer gets disconnected from a network which allowed it to access the original file system. The system transparently copies the file from the original file system to a local system whose structure is recorded in a local file database. When no longer connected to the network, the access to the file is redirected to the shadow file.

U.S. Pat. No. 5,819,296 describes a method and apparatus for moving (migrating) large number of files (volumes) from one computer system to another. Included are methods for moving files from primary storage to secondary storage and from one system to another system. In this latter case, the system copies the directory information, and the files that need to be migrated are manually copied. Then, the directory structure merged with the new storage system. The patent discusses moving files residing in volumes which are physical storage partitions created by system administrators.

U.S. Pat. No. 6,003,044 describes a system and method to back up computer files to backup drives connected to multiple computer systems. A controller system allocates each file in a backup set system to one or more multiple computers. Each of the multiple computer systems is then directed to back up files in one or more subsets, which may be allocated to that computer system. The allocation may be made to optimize or load balance across the multiple computer systems.

A problem which plagues such systems is the overhead involved in accessing archived individual data objects from a remote site. Remote accesses such as this are typically fraught with delay caused primarily by the high latency of archival resources such as tape and, to a lesser degree, the network latency and system overhead. This delay limits the effectiveness of such systems. To overcome the delay, the user might manually aggregate data objects using tools provided by the operating systems or third parties, and copy the data to a nearby facility. However, this requires the user to be familiar with the physical location of the data objects and manner in which they are aggregated and stored, a factor which further limits the effectiveness of the system.

Consequently, there is a need for a system of and method for managing data objects distributed across heterogenous resources which reduces or eliminates the delay or latency characteristic of conventional systems.

There is also a need for a system of and method for managing data objects distributed across heterogeneous resources in which the physical location of and manner in which the data objects are stored is transparent to the user.

There is also a need for a system of and method for providing a data aggregation mechanism which transparently reduces overhead and delay caused by the high latency of archival resources.

There is further a need for a system of and method for managing data objects distributed across heterogenous resources which overcomes one or more of the disadvantages of the prior art.

The objects of the subject invention include fulfillment of any of the foregoing needs, singly or in combination. Further objects and advantages will be set forth in the description which follows or will be apparent to one of ordinary skill in the art.

SUMMARY OF THE INVENTION

In accordance with the purpose of the invention as broadly described herein, there is provided a system for transparent management of data objects in containers across distributed heterogeneous resources comprising: a client configured to issue requests relating to data objects in containers in response to user commands; at least one server accessible by the client over a network; a broker process, executable on a server, for responding to a request issued by a client; a meta-data catalog maintained on a server, and accessible by the broker, for defining data objects and containers, and associating data objects with containers; and at least one data resource maintained on one or more servers for storing data objects in containers; wherein the broker, responsive to a request, is configured to access the meta-data catalog, process the request using the meta-data catalog, and then update the meta-data catalog to reflect changes incidental to the request, whereby data objects, once aggregated into containers, are maintained therein transparent to users.

Also provided is a method of creating a logical resource comprising the steps of: associating one or more physical resources with the logical resource; for each physical resource, specifying a type thereof from the group comprising an archive, a cache, a primary archive, and a primary cache; and for each physical resource, also specifying size and access control information.

A method of creating a container is also provided comprising the steps of: specifying, in response to a user request, a name of a container and a logical resource to be allocated to the container, the logical resource being associated with one or more physical resources, including at least one archive and at least one cache; creating meta-data for the container, including meta-data specifying the container name, the logical resource to be allocated to the container, and the one or more physical resources associated with the logical resource; storing the meta-data for the container in a meta-data catalog; and reserving one or more of the archives allocated to the container.

The invention further includes a method of importing a data object into a container comprising the steps of: specifying a container; querying meta-data for the container, including an offset within the container; finding or staging to a selected resource a current cache copy of the container; writing the data object into the cache copy at the specified offset; updating the meta-data for the container to reflect introduction of the data object into the container; and marking the cache copy as dirty or synchronizing it with any other copies.

A method of synchronizing a plurality of copies of a container is also included comprising the steps of: if no copies of the container are marked as dirty, ending the method; if a cache copy of the container is marked as dirty, synchronizing such to one or more archival copies that are not marked as dirty; if all archival copies are thereby written over, resetting the dirty flags of all such archival copies; and if one or more but not all archival copies are thereby written over, setting the dirty flags of the one or more archives that are written over.

The invention also includes a method of reading a data object from a container comprising the steps of: querying meta data for the container, including an offset where the data object is stored within the contain; finding or staging to a selected resource a current cached copy of the container; and using the offset to retrieve the data object from the cached copy of the container.

DESCRIPTION OF THE DRAWINGS

FIG. 15a illustrates an example implementation of container meta data associating a container with one or more data objects stored in the container.

FIG. 15b illustrates an example implementation of container meta data associating a container with one or more physical resources.

DETAILED DESCRIPTION OF THE PREFERRED EMBODIMENTS

I. Example Environment

A. An Overview of the Storage Resource Broker (SRB) Architecture

Figure 1:
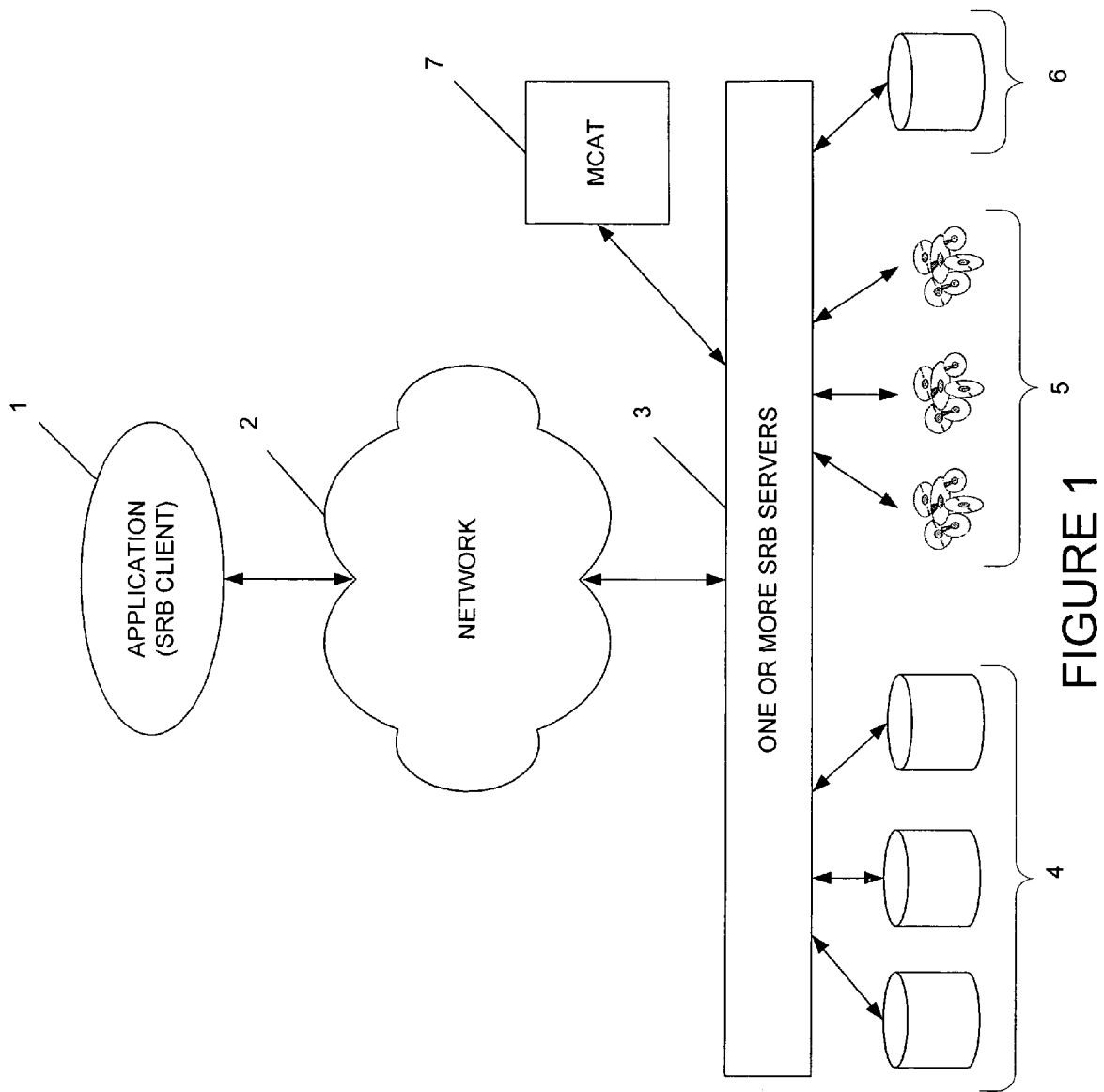
FIG. 1 is a simplified view of Software Resource Broker (SRB) middleware.

The Storage Resource Broker (SRB) system is one example environment in which the subject invention may be deployed. It comprises middleware that provides distributed clients with uniform access to diverse storage resources in a heterogeneous computing environment. FIG. 1 gives a simplified view of the SRB architecture. As illustrated, the system comprises an application 1, embodied in one implementation in the form of an SRB client, one or more SRB servers 3 which are accessible by the client over network 2 (which may be a proprietary network or a public network such as the Internet), and a meta-data catalog (MCAT) 7 which is accessible by the one or more SRB servers 3. One or more distributed system resources, including data base management systems 4, such as DB2, Oracle, Illustra, or ObjectStore, archival storage systems 5, such as HPSS or UniTree, or file systems 6, such as UNIX or ftp, may be accessible by the one or more SRB servers 3.

The MCAT 7 stores meta-data associated with data sets, users and resources managed by the SRB system. The MCAT server (not shown) handles requests from the one or more SRB servers 3. These requests include information queries as well as instructions for meta-data creation and update.

Client applications are provided with a set of APIs for sending requests and receiving response to/from the SRB servers 3. The SRB servers 3 are responsible for carrying out tasks to satisfy the client requests. These tasks include interacting with the MCAT 7, and performing I/O on behalf of the clients. A client uses the same APIs to access every storage system resource managed by the SRB system. The complex tasks of interacting with various types of storage system resources and OS/hardware architecture, are handled by the SRB servers 3.

B. The SRB Process Model

Figure 2:
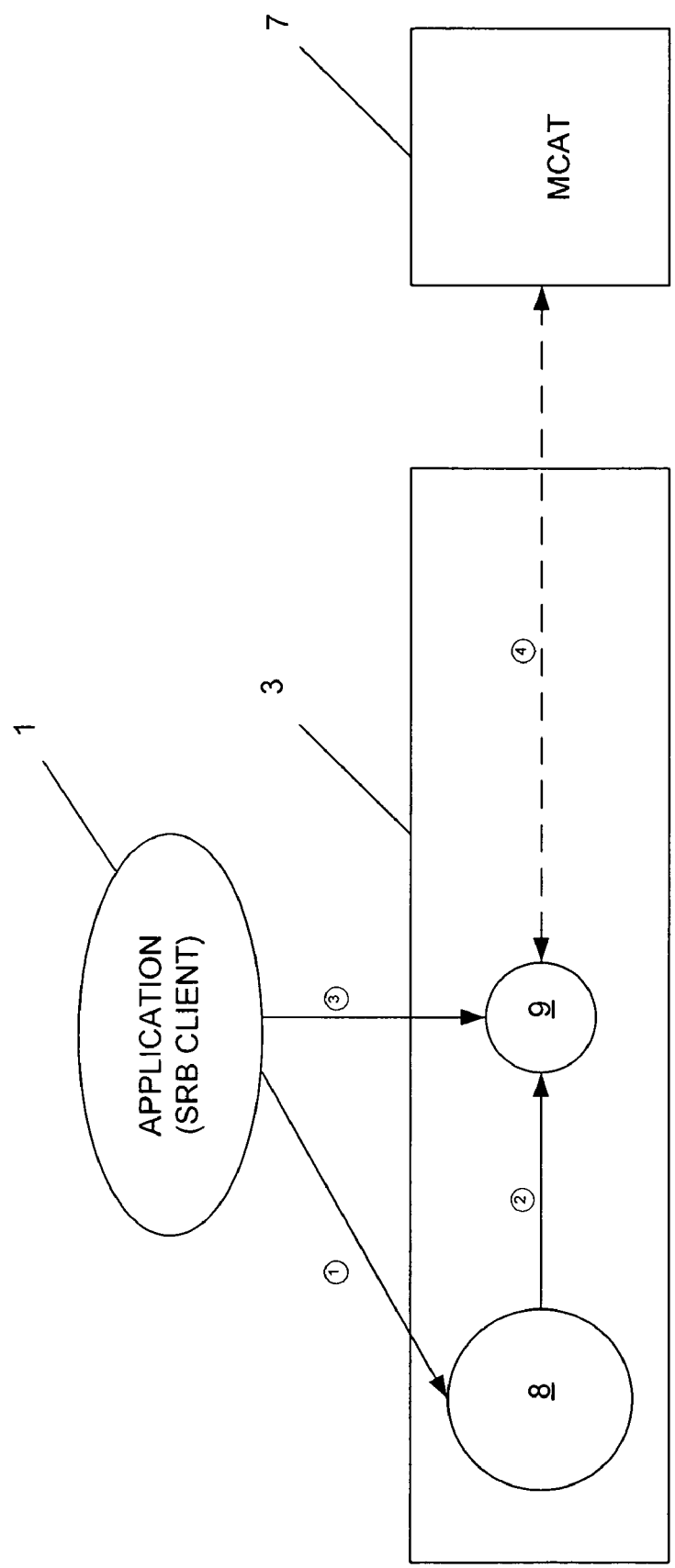
FIG. 2 illustrates the SRB process model.

FIG. 2 depicts the SRB process model. Compared to FIG. 1, like elements are FIG. 2 are referenced with like identifying numerals. The design of the SRB server 3 is based on the traditional network connected client/server model. It is composed of two separate processes, the SRB master 8 and the SRB agent 9. The SRB master 8 is the main daemon listening continuously on a well-known port for connection requests from clients. Once a connection from a client is established and authenticated, the master 8 forks and execs a copy of the SRB server, which is called SRB agent 9, to service the connection. From that point onward, the client and the SRB agent communicate using a different port and the SRB master 8 goes back to listening for more connections. This sequence is illustrated in FIG. 2. A client can use the same SRB agent to service multiple requests.

Client applications communicate with the SRB agent using a set of APIs via TCP/IP sockets. The client library sends requests using pre-defined request stubs to the SRB agent, and receives and parses replies from the SRB agent.

The model is distributed in the sense that clients and servers may be running on different hosts.

Figure 3:
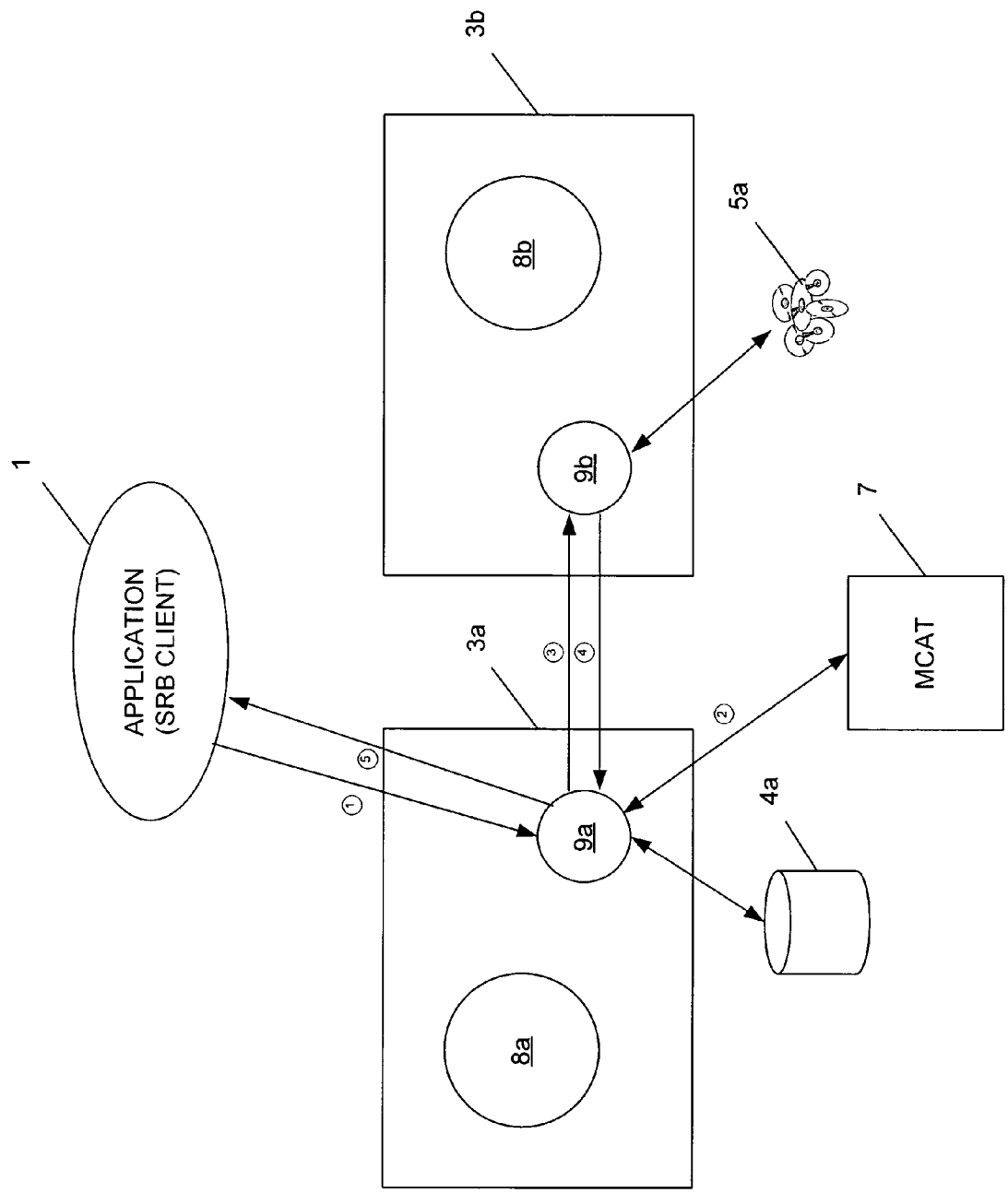
FIG. 3 illustrates federated SRB operation.

A group of distributed SRB servers coordinating with each other to service client requests can be configured to form a federation. FIG. 3, in which, compared to FIGS. 1-2, like elements are referenced with like identifying numerals, depicts the working of a federated SRB, consisting of two SRB masters 8a and 8b, running respectively on servers 3a and 3b, which in turn are running on hosts A and B. The SRB server 3a is MCAT enabled meaning that it can talk to the MCAT server.

In the example shown, client 1 issues an "open data set" request, which results in the following steps:
1) After completing the connection sequence with the SRB master 8a on host A, the client sends a request to the SRB agent 9a on host A to open a data set for reading.
2) The SRB agent 9a makes an MCAT call passing the client's user ID and the data set name to the MCAT server to check if the client has the proper access permission to the data set. If so, the MCAT call returns a data structure that contains the physical location where the data set is stored. The physical location data structure includes the host name, the storage system type (e.g., UNIX, HPSS, DB2 Large Object, etc) and the path name (e.g., a Unix file path).
3) The SRB agent 9a on host A realizes the requested data set is on host B and carries a remote open on behalf on the client passing along the storage system type and the path name to the SRB agent 9b on host B.
4) The SRB agent 9b on host B uses the storage system type to invoke the appropriate low level storage driver to invoke to handle the open call, passing along the path name to be opened. Upon completion of the open call, the SRB agent 9b on host B returns the opened file descriptor or error code to the SRB agent 9a on host A.
5) If the open call is successful, the SRB agent 9a on host A stores the returned file descriptor and other information such as host name, etc., in a internal data structure and passes back the pointer to this data structure to the client 1. The client 1 can then use this pointer in subsequent read calls. However, if the open call is not successful, an error code is returned instead.

C. The SRB Agent Design Details

As described above, the SRB system is designed based on the traditional client/server model. Client applications are provided with a set of simple APIs to communicate with the SRB servers. The main daemon, the SRB master, is responsible for the simple tasks of listening for incoming connections, and spawning a SRB agent to handle each connection once the client is authenticated. The SRB agents are responsible for receiving and servicing all subsequent client requests.

Figure 4:
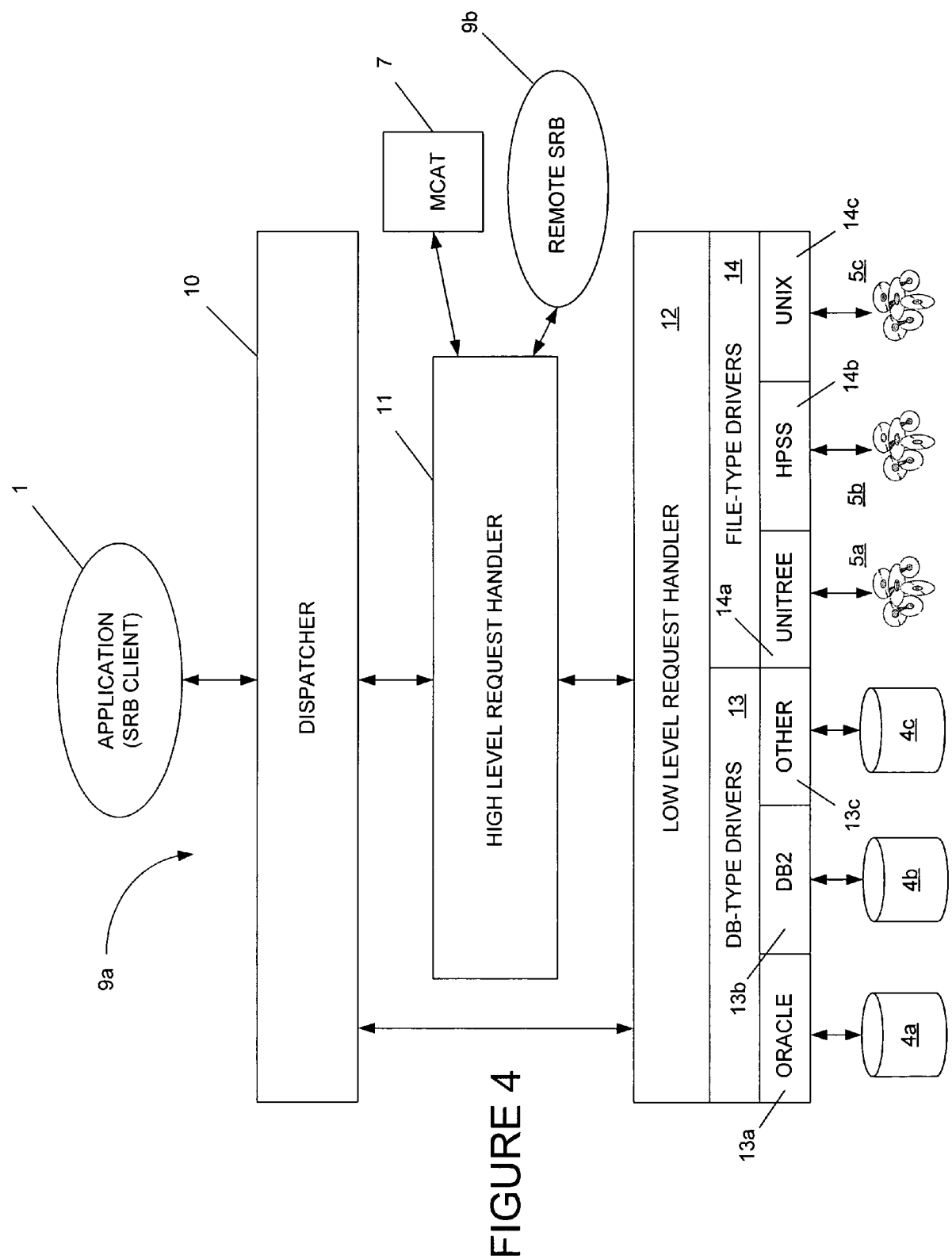
FIG. 4 illustrates the SRB agent design.

FIG. 4 gives a simplified view of the SRB agent design. Again, relative to FIGS. 1-3, like elements are referenced with like identifying numerals. At the top is the "dispatcher" module 10, which listens for incoming client requests and dispatches the requests to the proper request handlers. The dispatcher 10 is also responsible for returning the results to clients.

Clients are provided with two sets of APIs, high-level and low-level APIs. The high-level APIs handle data sets that access the MCAT server for meta-data management, while the low-level APIs handle data sets without using the MCAT. When using the high-level APIs to create a data set, the data set is automatically registered in MCAT and the MCAT keeps all relevant information associated with the data set until the data set is deleted. When accessing a data set using the low-level APIs, a client needs to provide all required information such as the physical location (host address and full path name) and the storage system type of the data set.

The high-level request handler 11 of the SRB agent handles all high-level client requests, which may originate from client 1 or a remote SRB server 9b, and the low-level request handler 12 handles low-level client requests. Through the high-level APIs, a client can access the following type of services provided by the SRB agents:
1) Create and remove data sets.
2) Perform I/O operations on data sets.
3) Manipulate and query meta data associated with the data sets and collections.
4) Manipulate and query meta data associated with other objects such as users, user-groups and resources managed by the SRB.

All these operations require the high-level request handler 11 to interact with the MCAT 7 to manipulate and query the meta-data stored therein. In addition, for requests in categories 1) and 2), low-level requests will be generated and dispatched to the low-level request handler 12 for further processing.

A set of library calls is used by the high-level request handler 11 to interact with the MCAT 7. These calls allow the SRB agent to register, unregister and modify meta data associated with data sets, users and storage resources, and to query the meta data. Basically, these routines translate easy-to-understood input parameters into complex SQL queries which are then sent to the MCAT server. Upon receiving the query results from the MCAT server, these routines parse the query results into simple forms before returning them to the caller.

The type of MCAT call made by an SRB agent depends on the type of client call the SRB agent is handling. For example, to handle a "create data set" call, a query is sent to the MCAT server on the requested storage resource. If the client is allowed to create a data set in this storage resource, the MCAT server returns the physical location (host name, directory path) and storage system type of the requested storage system to the caller. Using the returned directory path, a unique physical path name (e.g., UNIX or HPSS path name or a SQL query) is generated. A low-level "create" call is generated and dispatched, passing on the host name, path name and storage system type parameters to the low-level request handler 12. If the low-level create call is successful, a "register data set" call is made to the MCAT server, passing on the data set name, the collection in which to put the data set, the storage resource, the physical path name and the user name. The MCAT registration routine does a few consistency checks (such as the permission to create data sets in the specified collection, duplicate data set name, etc). If the registration is successful, a set of meta data associated with the newly created data set is added to the MCAT 7. Finally, the SRB agent returns a handle to the client. The client can then use this handle for subsequent read/write calls. If the data set register call is unsuccessful, a low-level unlink call is dispatched and an error is returned to the client.

The low-level request handler 12 handles low-level client requests dispatched directly from the request dispatcher 10, or high-level client requests passed indirectly through the high-level request handler 11. This module performs the basic I/O operations on behalf of the client on the various storage systems managed by the SRB agent. The common parameters passed to this module are the resource location (host name), the storage system type (UNIX, HPSS, DB2, etc) and the physical path name (UNIX path name). If the requested storage system is not local, low-level request handler 12 dispatches a remote call to the appropriate SRB agent. Otherwise, it calls its low-level drivers to carry out the I/O operation.

Two types of drivers, the file-type 14 and the database (DB)-type 13, are supported. The file-type drivers include UNIX-like file I/O interfaces 14*a*, 14*b*, 14*c* to the file system of the storage systems, i.e., UniTree, HPSS, and Unix. Other non-file system type drivers, such as FTP and HTTP, may also be included under this category because of the similarities in the I/O interface. I/O operations supported by the file-type drivers 14 include create, open, close, unlink, read, write, sync, seek, stat, chmod, mkdir, opendir, closedir and readdir.

The DB-type drivers 13 provide an I/O interface to DB large objects stored in various database management systems (DBMS). Included are interfaces 13*a*, 13*b*, 13*c* to respectively Oracle, DB2 and Illustra. I/O operations supported by the DB-type drivers include create, open, close, unlink, read, write and seek.

D. Typical SRB Usage Scenarios

Some typical SRB usage scenarios include the following:

1—Managing distributed data sets

The SDSC Storage Resource Broker makes it possible to manage data sets that are distributed across multiple storage systems. If you need to access data sets that are located on your local file system, on the file system at another site, in an archive, or even stored as tables within a database, the SRB provides the management tools. Users can define unique, persistent identifiers for each data set, store the identifiers in a catalog, and then discover and access all data sets listed in the catalog. The SRB provides access control and audit trails for all changes to the data sets, and even all accesses of the data sets. The SRB accomplishes this even when the data sets are stored in different administration domains, even when the data sets are initially owned by different persons, and even when different vendor products are used for the storage systems at each site.

The underlying technologies that the SRB employs to provide uniform access to distributed data sets are:

the SRB supports access to storage systems. Since the SRB runs as an application at each site, the local storage management policies can still be used.

the SRB organizes the data sets into folders. For each data set, the storage location, access protocol, access control lists, audit trails, and folder are stored as attributes within the collection catalog. When the data sets are moved using the SRB data access routines, the metadata catalog is automatically updated. The SRB maintains the persistent identifiers for each data set. No more broken URLs.

the SRB uses the Generic Security Service API to support access to the commonly used authentication systems. Access is provided to storage systems that use Kerberos, SSL, DCE, public key certificates, or Unix style authentication systems.

the SRB stores data at each site under its own user ID. Users of the system authenticate themselves to the SRB data handling system. The data handling system authenticates itself to each distributed storage system. This eliminates the need for users to have their own login account at each remote storage system. This makes it easier to assemble data collections that span multiple adminstration domains. Separate access control lists are kept for each data set managed by the SRB, guaranteeing that data privacy can be maintained.

the SRB uses TCP/IP to transport data over networks. The SRB works across the Internet, and even supports access to remote web sites.

2—Replicating Data

The only way to guarantee that data is safely stored is to replicate the data set at another site. This minimizes risk associated with fires, floods, earthquakes, and tornados. At the same time, replicas of data sets can be used to improve access, handle network outages, and serve as backups. The SRB is the only data management system that incorporates all three capabilities within the same system. Because the SRB stores information about each data within a catalog, it is very easy for the SRB to also store data about replicates of the data set. When the data is accessed, the SRB will switch to an alternate site if the first site is not available. The replication can be automated through the assignment of logical resources that span multiple physical storage systems. Writing to the logical resource is then the same as writing simultaneously to all of the physical resources. If the logical resource includes a local file system and an archival storage system, then the data set is automatically backed up into the archive. If the logical resource includes two file systems, then data will be replicated to the second file system for use at another site. The replicas can be independently managed by explicit copies of data sets to other SRB controlled storage systems. This effectively is the same as caching data at remote sites.

3—High Performance Data Management

The SRB supports the concept of containers for aggregating data sets. Just as paper hardcopy can be put into a folder before storage in a filing cabinet, data sets can be put into a container before storage in an archive. Use of containers can be set up completely transparently to the users by defining that a container is to be used with a particular SRB folder. As data is stored into the SRB folder, the container will be filled to a specified maximum limit. When the limit is reached, the container will be stored in the archive, and a new container will be started. Users continue to retrieve data sets by their original names. The SRB will automatically cache the appropriate container to disk, then read the desired data set from the disk cache. The containers serve two very useful purposes, they keep associated data sets physically together on each storage system, and they provide a way to aggregate data sets together before storage into an archive. The archive only sees folders, while the catalog contains information about each data set within the containers.

4—Persistent Archives

One of the hardest challenges facing users of digital data sets is managing technology obsolescence. The rapid rate of change of the software and hardware systems means that data that is only three years old may be on obsolete storage systems, and may be in danger of being lost. The SRB data handling systems provides the interoperability mechanisms needed to create a persistent archive. As new storage systems become available, new drivers can be added to the SRB servers to support access to the new type of storage systems. As new authentication systems become available, interfaces can be added through the Generic Security Service. As new types of database catalogs become available, the SRB attribute catalog can also be migrated. The SRB is able to export all of the catalog attributes in a standard information model, and then import the catalog attributes into the new database system. The information model is based upon the extensible Markup Language with the attributes organized using a Document Type Definition. Thus all of the components of a persistent archive can be migrated to new technology. Obsolescence is then handled by telling the SRB to replicate data onto the new technology, and can be handled automatically through assignment of new logical resources.

E. Advantages of SRB Model

The SRB model described in the foregoing sections provides the following benefits and advantages:

1) Transparency—through appropriate registration in the MCAT of meta-data describing the name, physical location, and access protocol for data, such information can be maintained transparently to the user.
2) Interoperability—through appropriate registration in the MCAT of meta-data describing the device driver for a particular database management system or file system, a plurality of diverse and heterogenous databases and file systems can be maintained in a single, integrated environment transparently to the user.
3) Security—through appropriate registration in the MCAT of authentication and access control information for particular data, secure access to the data can be provided in a manner which is transparent to the user.
4) Scalability—since the number of servers and clients that can be maintained on the system is virtually unlimited, the SRB system is easily scalable to environments requiring large numbers of clients and/or servers.
5) Collections management—logical collections of data distributed across multiple environments can be maintained in the SRB system through meta-data associating particular data to a collection.
6) Replication/synchronization—data replication and synchronization is provided transparently to the user through containers.
7) Containers—aggregation of objects to provide access speed up, physical co-location, ease of movement.

II. Preferred Embodiments of the Subject Invention

Figure 14A:
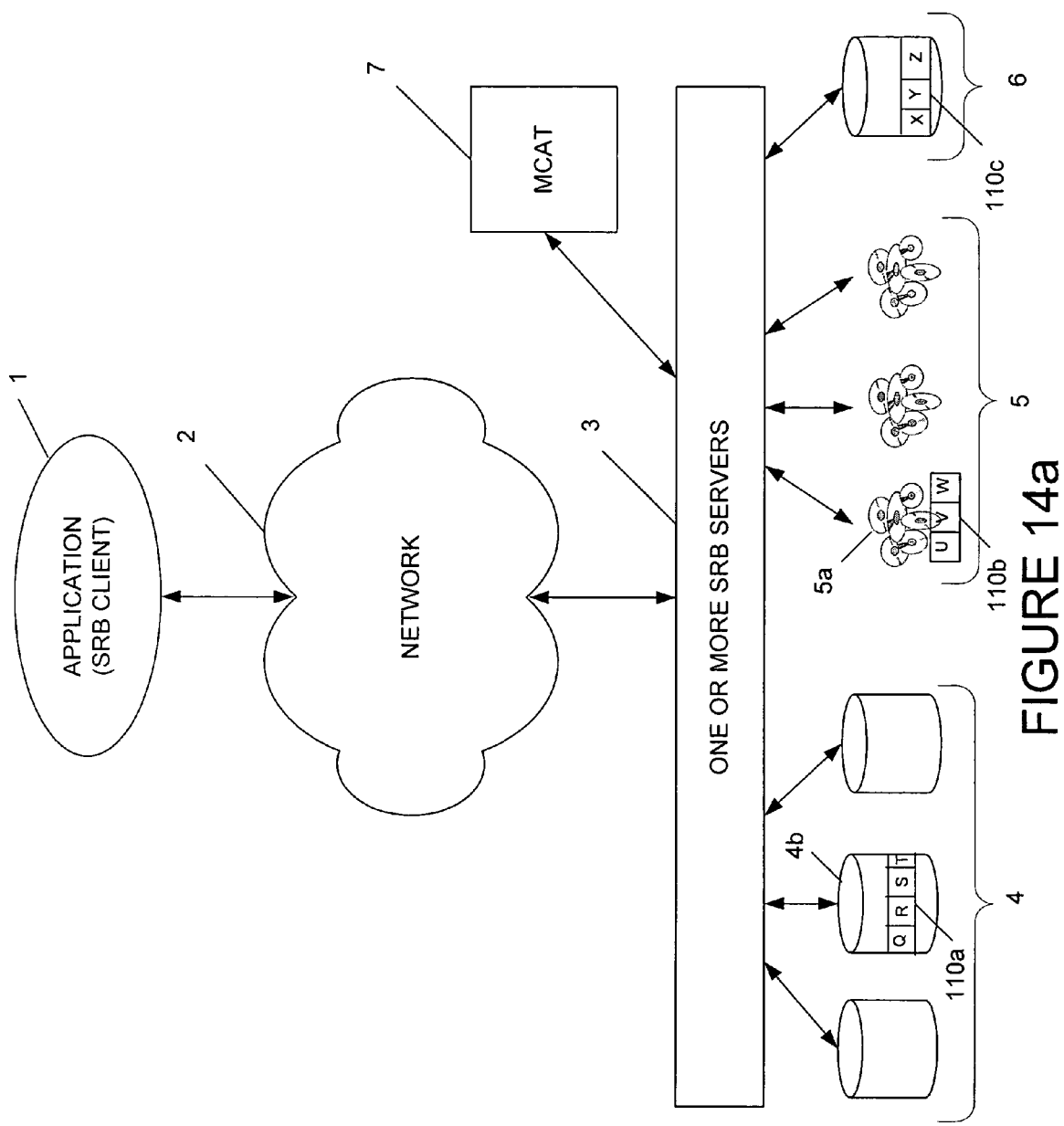
FIG. 14a illustrates multiple containers maintained in a system configured in accordance with one embodiment of the subject invention.

One or more embodiments or implementations of a system configured in accordance with the subject invention at various times during the processing of user requests involving containers is illustrated in FIGS. 14a-14j. As can be seen, these embodiments will be illustrated and described in the context of the system of FIG. 1. Accordingly, in each of FIGS. 1 and 14a-14j, like elements will be referenced with like identifying numerals. FIG. 14a illustrates an embodiment of the system after three containers, identified respectively with numerals 110a, 110b, and 110c, have been created. As shown, container 110a, comprising data objects Q, R, S, and T, is stored on DBMS 4a. Similarly, container 110b, comprising data objects U, V, and W, is stored on archival system 5a. Finally, container 110c, comprising data objects X, Y, and Z, is stored on file system 110c. Each of the data objects in these containers is accessible to one or more clients 1.

Figure 14B:
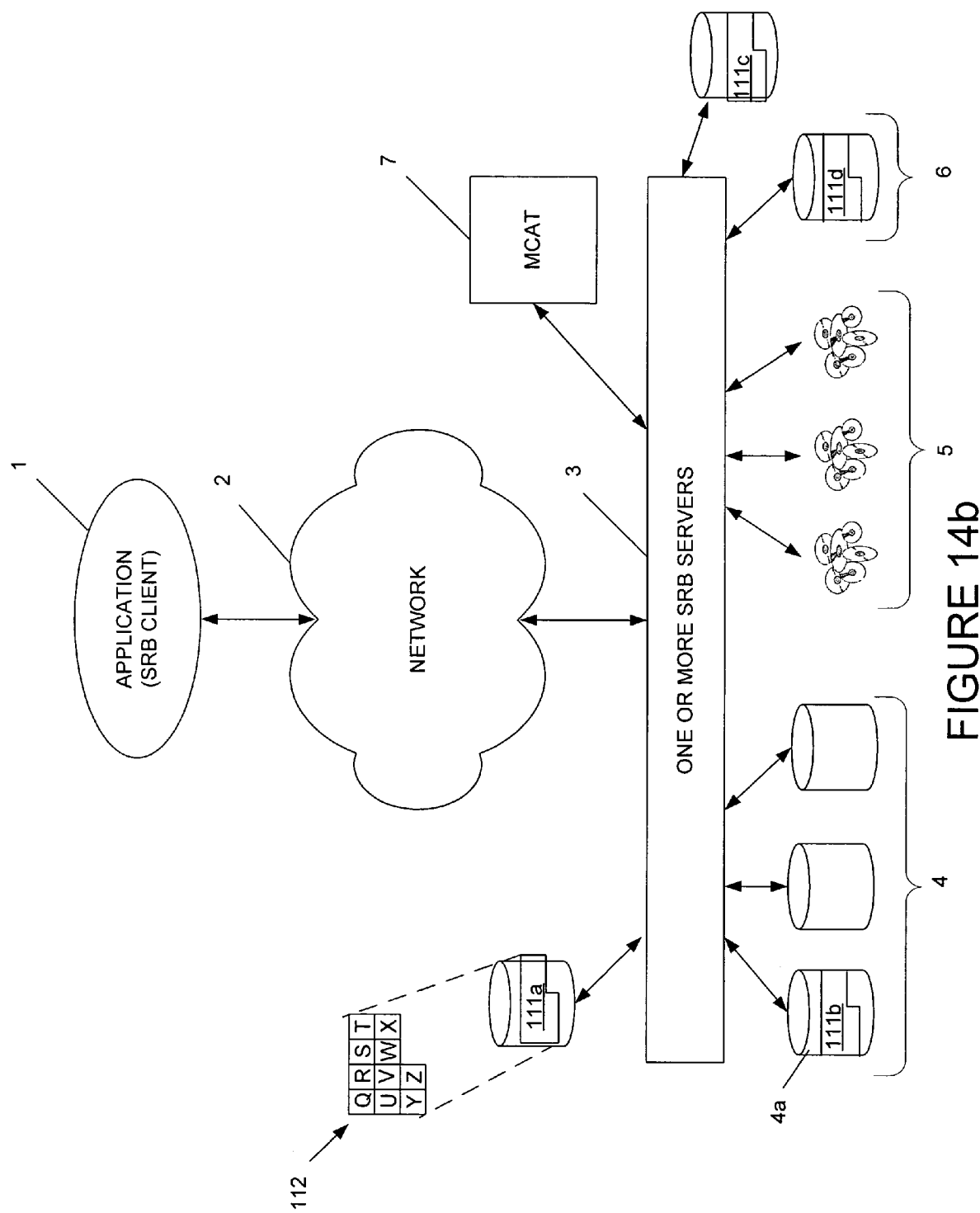
FIG. 14b illustrates multiple physical resources allocated to a container in a system configured in accordance with one embodiment of the subject invention.

FIG. 14b illustrates an embodiment of the system after four distinct physical resources, comprising cache 111a, archival storage 111b in DBMS 4a, cache 111c, and archival storage 111d maintained on file system 6, have been assigned to a container 112 comprising the data objects, Q, R, S, T, U, V, W, X, Y, and Z. The embodiment is shown at a time in which the data objects in the container, identified with numeral 112, have only been stored in cache 111a, and have not been stored in the other physical resources—archive 111b, cache 111c, and archive 111d—assigned to the container. In one example, because of their speed, the caches are implemented as magnetic disk file systems.

Figure 14C:
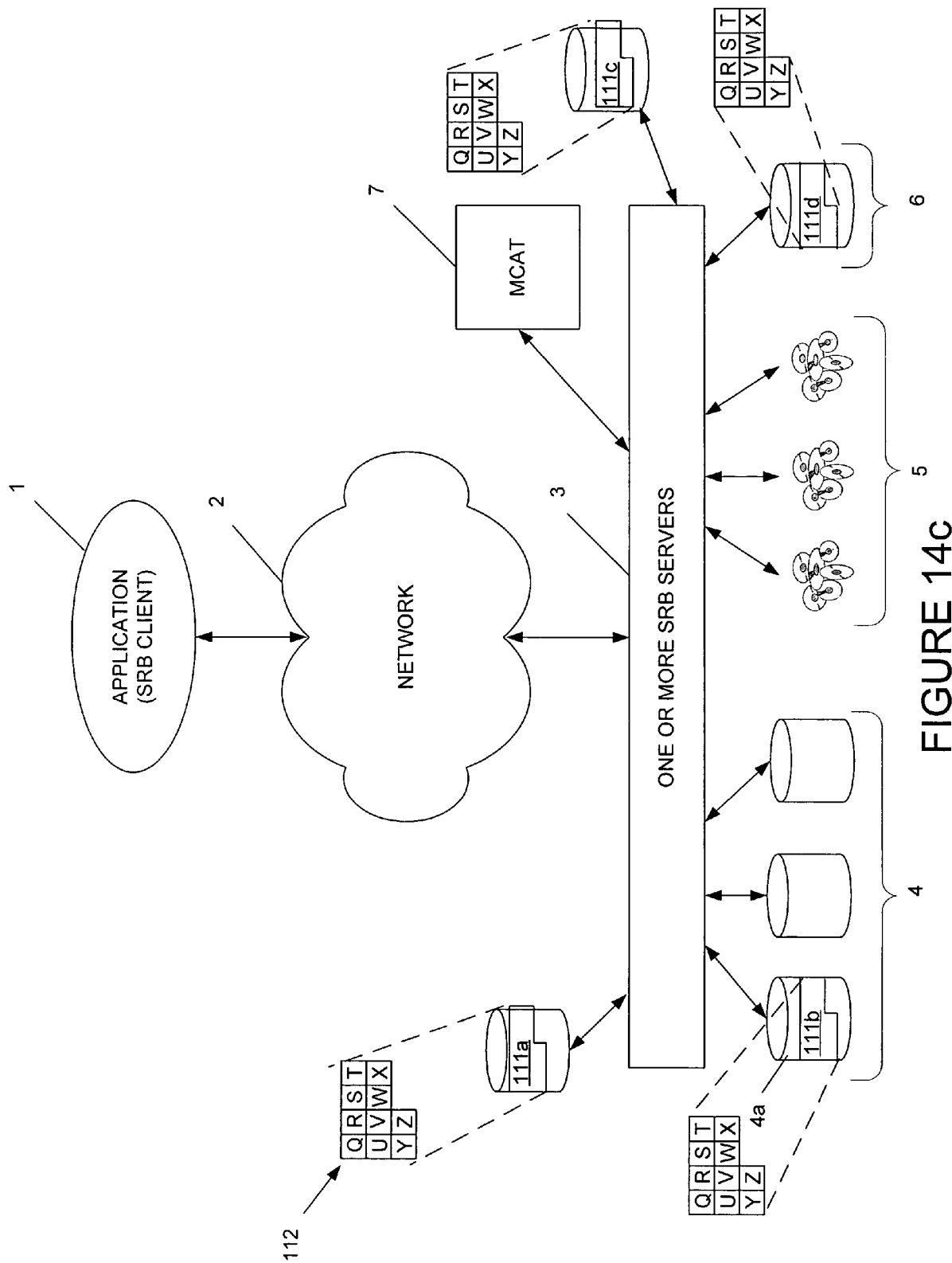
FIG. 14c illustrates replication of a container across multiple archival resources in a system configured in accordance with one embodiment of the subject invention.

FIG. 14c illustrates an embodiment of the system at a time after which the data objects Q, R, S, T, U, V, W, X, Y and Z, in the cache 111a have been copied, transparent to client 1, to all the other physical resources assigned to the containerarchive 111b, cache 111c, and archive 111d. At this time, all copies of the container, being identical, are synchronized.

Figure 14D:
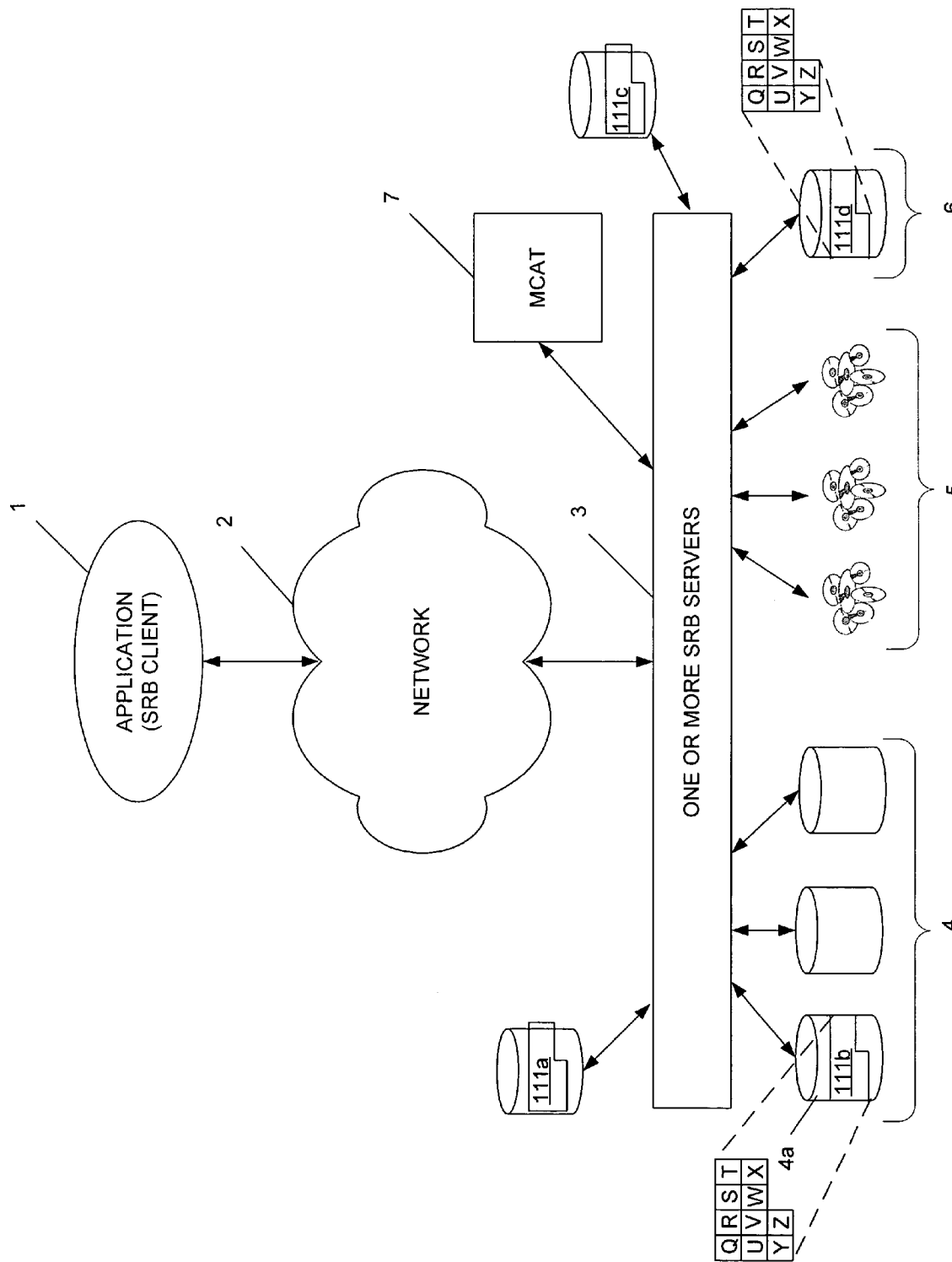
FIG. 14d illustrates purging one or more cached copies of a container in a system configured in accordance with one embodiment of the subject invention.

FIG. 14d illustrates an embodiment of the system after the copies of the container maintained in caches 111a and 111c have been purged in order to free up system resources for other uses. In one implementation, cached copies of the container are purged in response to a synchronization command having as an argument a purge flag. When the purge flag is set, the copies of the container are synchronized, and in addition, the cached copies are purged. When the purge flag is clear, the copies of the container are merely synchronized, and the cached copies are not purged. In another implementation, the cached copies are purged whenever the synchronization command is executed.

Figure 14E:
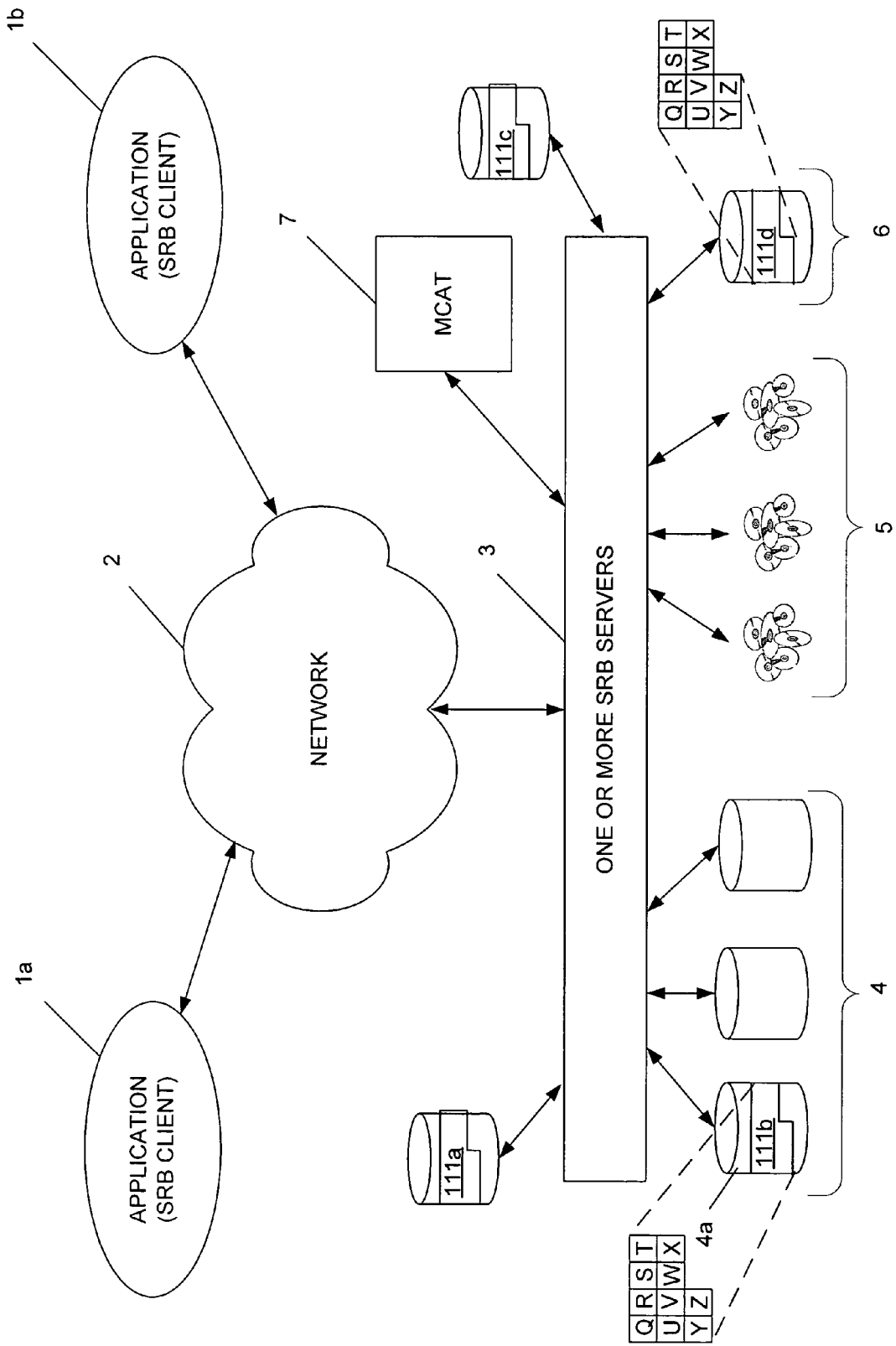
FIG. 14e illustrates system configured in accordance with one embodiment of the subject invention in which different client requests are handled through different archived copies of a container.

FIG. 14e illustrates an embodiment of the system at the point at which requests concerning data objects in the container have arisen from two different clients, identified respectively with numerals 1a and 1b. As illustrated, it is assumed that, at this time, copies of the container have been purged from caches 111a and 111c, and that copies are only present in archival storage 111b of DBMS 4a and archival storage 111d of file system 6. In this particular example, because of the physical proximity of DBMS 4a to client 1a, the request from client 1a is resolved, transparently to client 1a, through the container copy in archive 111b on DBMS 4a. Similarly, because of the physical proximity of file system 6 to client 1b, the request from client 1b is resolved, again transparently to client 1b, through the container copy in archive 111d maintained on file system 6.

In one implementation, the request from client 1a is resolved by first staging a copy of the container from DBMS 4a to cache 111a. Then, the request is resolved from the copy stored in cache 111a. In this implementation, once a cache copy exists, a request from a client will always be resolved from it even though it is not in close proximity with the client. Consequently, in this implementation, the request from client 1b is resolved from the copy stored in cache 111a. Alternatively, the request is resolved by first staging a copy of the container from file system 6 to cache 111c. Then, the copy is resolved from the copy stored in cache 111c. In another implementation, the requests are each resolved directly from the archived copies of the container.

Figure 14F:
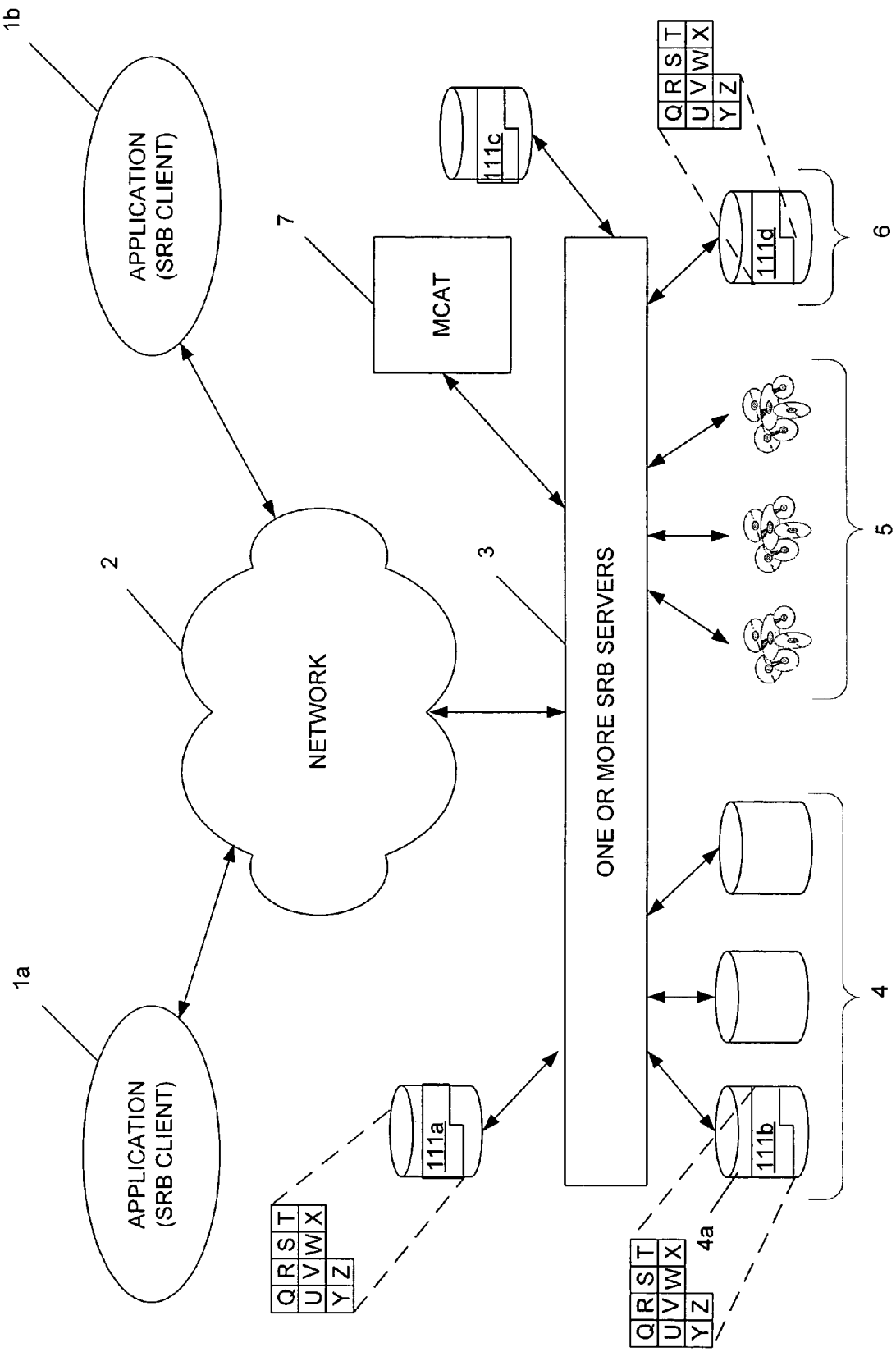
FIGS. 14f-14g illustrates the process of caching one or more of the archived container copies in the system of FIG. 14e.

FIG. 14f illustrates an implementation of the system in the case in which requests are always resolved from cached copies of the container rather than from archived copies. The implementation is shown at the particular instant in which the request from client 1a has been received, and responsive thereto, a copy of the container has been staged, transparently to client 1a, to cache 111a from the archived copy in archive 111b on DBMS 4a. In this particular implementation, requests involving both read and write operations regarding the container are performed on the copy of the container stored in cache 111a. Then, this copy of the container is either marked as dirty, or is automatically synchronized with the copies of the container maintained on the other physical resources assigned to the container.

Figure 14G:
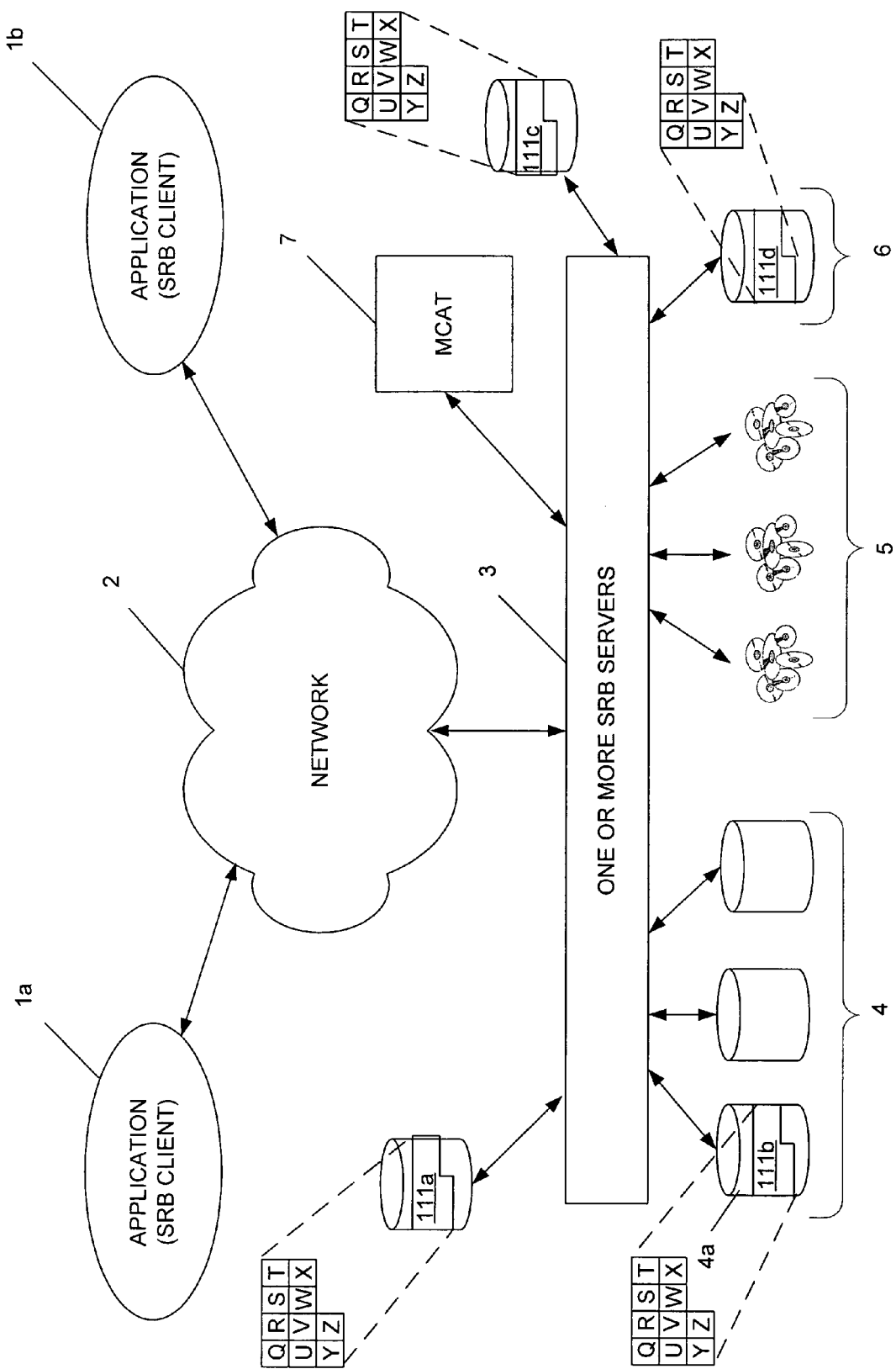

FIG. 14g illustrates the implementation of FIG. 14f at the particular moment at which the request from client 1b has been received, and, responsive thereto, a copy of the container has been staged, transparently to client 1b, to cache 111c from archive 111d of file system 6. Again, implementations are possible in which both read and write requests are resolved from the cached copy, and in which only read operations are resolved from the cached copy.

Figure 14H:
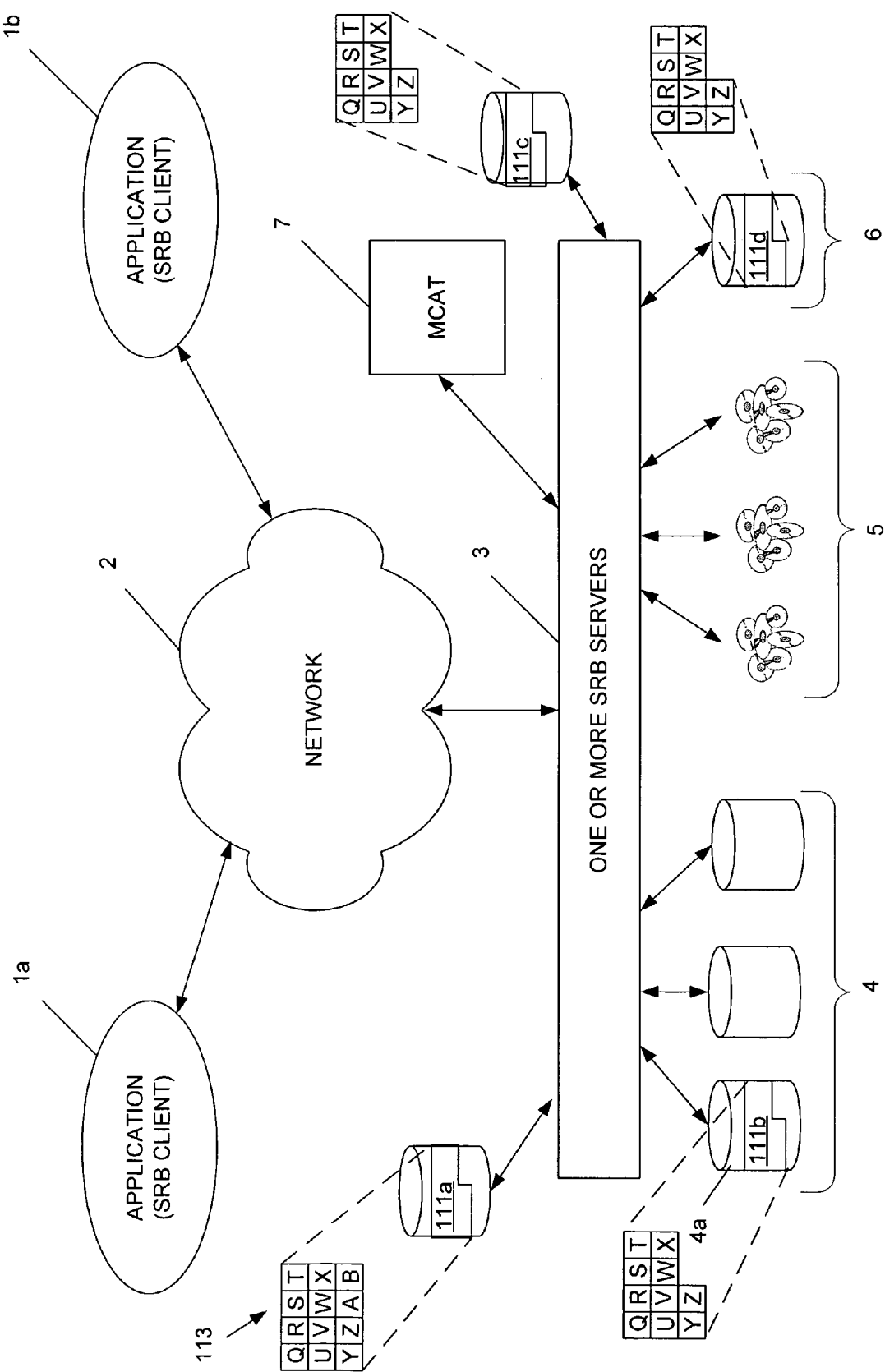
FIG. 14h illustrates the process of writing one or more data objects into one of the cached container copies in the system of FIG. 14g.

FIG. 14h illustrates an implementation of the system after a write request to container 112 from client 1a has been received and processed. In this particular implementation, in response to the request, transparently to client 1a, a copy of the container has been staged from archive 111b to cache 111a, and the meta-data for the container queried to determine the next available offset within the container. Thereafter, the data objects to be written into the container—A and B—have been written into the cached copy of the container at the next available offset. As can be seen, as a result of this operation, the copy in cache 111a is out of synchronization with the copies maintained in archival storage 111b, cache 111c, and archival storage 111d. Consequently, in one implementation example, a dirty flag for the copy in cache 111a is set, indicating it is out of synchronization with the other copies, and also that the copy is cache 111a is the only up to date copy of the container.

Figure 14I:
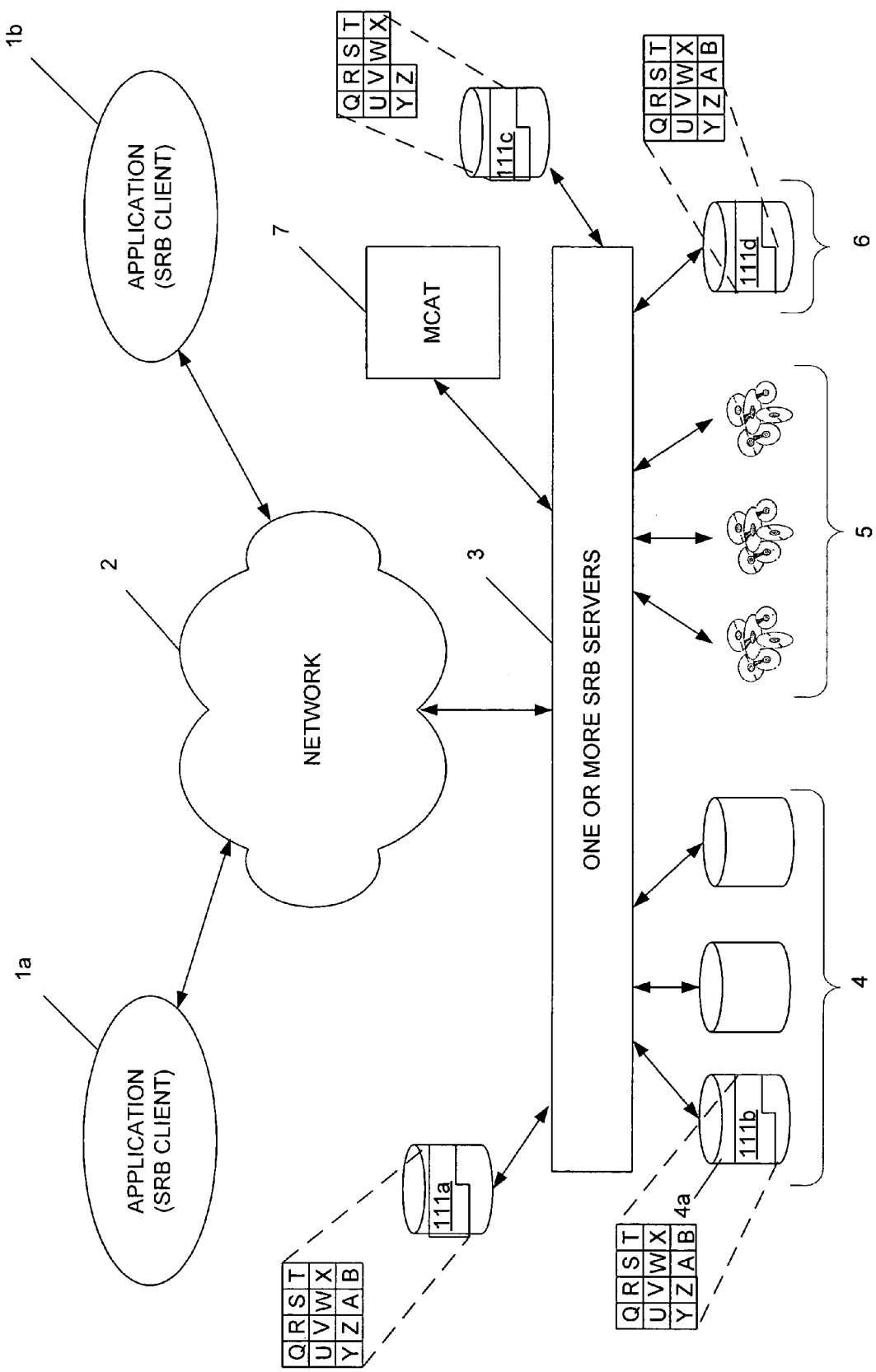
FIG. 14i illustrates the process of synchronizing a dirty cached copy of a container with one or more archival copies in the system of FIG. 14h.

FIG. 14i illustrates the implementation of FIG. 14h after the updated copy of the container stored in cache 111a (including data objects A and B) has been synchronized with the archived copies of the container maintained in DBMS 4a and file system 6. Note, that, in this particular embodiment, the copy stored in cache 111a is only synchronized with the copies in archives 111b and 111d, and not with any other cached copies of the container, such as the copy stored in cache 111c, but it should be appreciated that alternate implementations are possible in which synchronization is performed with all physical resources assigned to the container, including all caches assigned to the container. In one implementation example, synchronization is performed in response to a command issued by a user. In another implementation, synchronization is performed completely transparently to the user.

In one implementation example, a read and write locking mechanism is employed which operates as follows: First, multiple clients can open a container for reading. Second, if one or more clients have opened a container for reading, all subsequent attempts to open the container for writing will be blocked until all outstanding openings of the container for reading have been closed. Third, if a client has opened a container for writing, all subsequent attempts by other clients to open the container for reading will be blocked until the opening for writing has been closed.

Figure 14J:
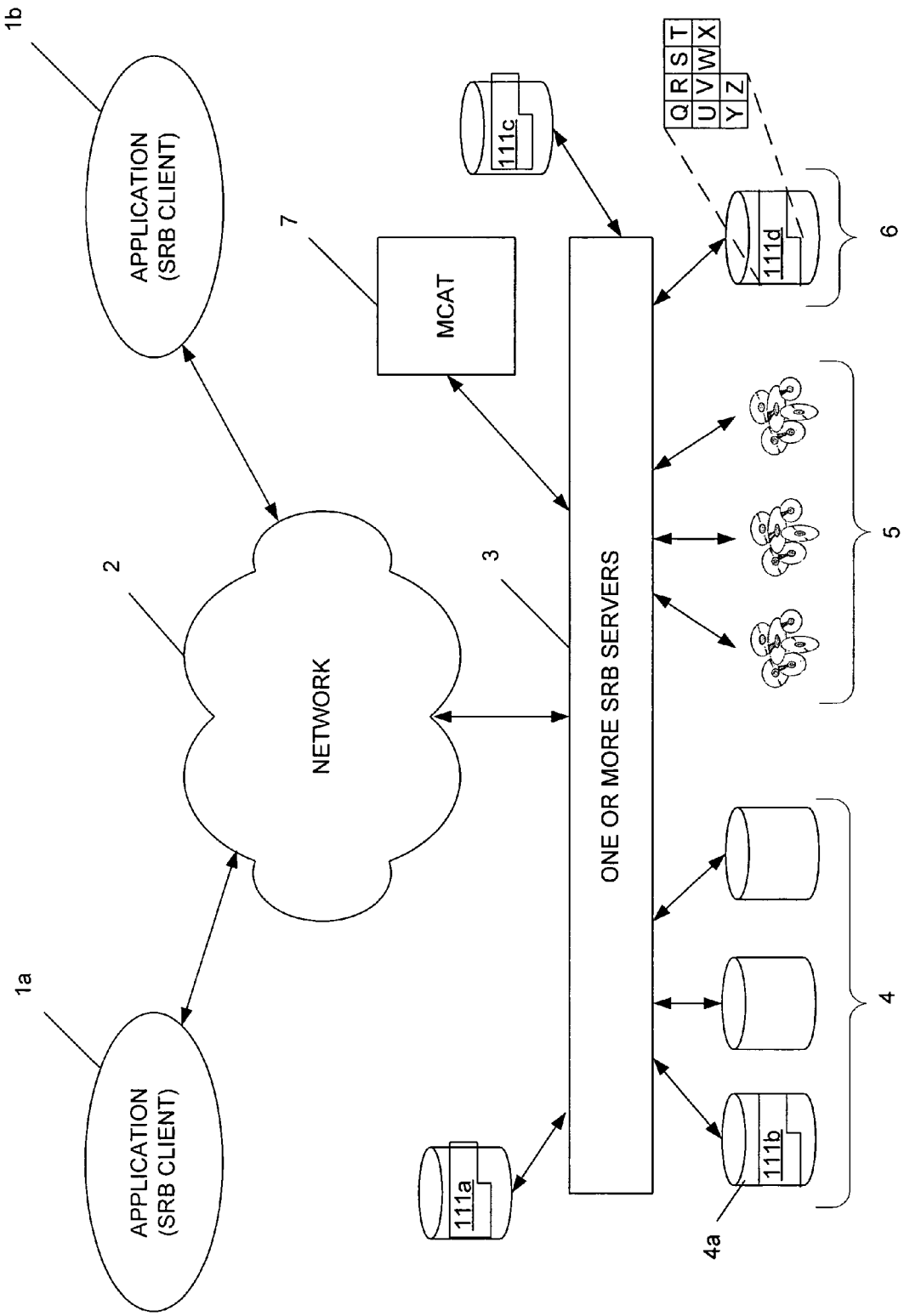
FIG. 14j illustrates transparent replication of a container across the network in a system configured in accordance with one embodiment of the subject invention.

FIG. 14j illustrates an embodiment of the system at a time when client 1a issues a request that involves the container 111, and a copy thereof only happens to be present on archival storage 111d of file system 6. In this particular embodiment, the request is handled, transparently to client 1a, by first staging a copy of the container to cache 111c, and then copying the copy from cache 111c to cache 111a. Then, the request is resolved through the copy stored in cache 111a. At some point, the container may also be copied to archival storage 111b of DBMS 4a.

In the foregoing implementations and embodiments, many of the operations described are performed transparently to the user. The mechanism for allowing these transparent operations to occur is meta-data stored in MCAT 7. FIGS. 15a-15b illustrate an example implementation of container meta-data that allows these transparent operations to occur. FIG. 15a illustrates an example of meta-data which associates a particular container with the data objects stored in the container, and the offset within the container at which each data object is stored. In the example illustrated, data objects Q, R, S, T, U, V, W, X, Y, and Z are associated with the container FOO_BAR, and data objects D, E, F and G are associated with the container FOO_BAR1.

FIG. 15b illustrates an example of meta-data which associates a particular container with the physical resources assigned to the container. In the example illustrated, the resource and its type are embodied in the data, as well as one or more flags which are used for various purposes, such as indicating whether a copy of the container is presently stored in the physical resource, whether the copy of the container stored at the particular resource is dirty or not, etc. As shown, the physical resources from FIGS. 14a-14j, comprising cache 111a, archive 111b from DBMS 4a, cache 111c, and archive 111d from file system 6, are assigned to the container FOO_BAR.

This meta-data is established when a container is first created, and is updated as the container is modified, or as other changes affecting the container occur. When a user initiates a request involving the container, the meta-data is queried to allow operations involving the container to occur transparently to the user. For example, when a user initiates a read from a container, the system might query the meta-data to perform the following operations transparently to the user: 1) locating a cached copy of the container, or if none is available, staging an archived copy to cache; and 2) retrieving a data object from the cached copy at an offset obtained from the meta-data. Similarly, when a user initiates a write operation to a container, the system might query the meta-data to perform the following operations transparently to the user: 1) locating a cached copy of the container, or if none is available, staging an archived copy to cache; 2) writing the data object to the cached copy at an offset obtained from the meta-data; and 3) either marking the cached copy as dirty or synchronizing the cached copy with any copies maintained on the other physical resources assigned to the container. Finally, when a user initiates a synchronization operation for a container, the system might query the meta-data to perform the following operations transparently to the user: 1) locating a current cached copy of the container; 2) copying this cached copy to one or more of the other physical resources assigned to the container.

Figure 16A:
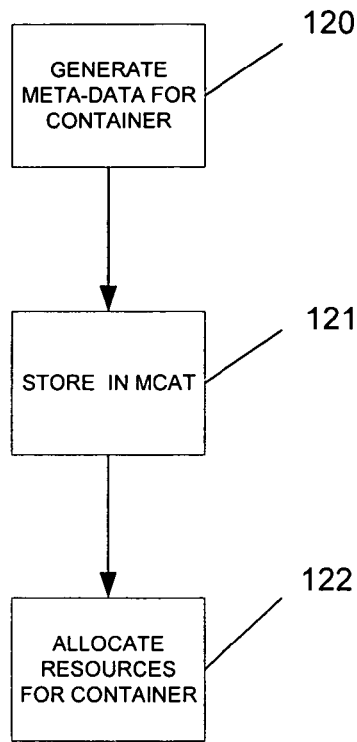
FIG. 16a illustrates a method of creating a container in accordance with one embodiment of the subject invention.

FIG. 16a is a flowchart depicting one embodiment of a method of creating a container in accordance with the subject invention. In step 120, meta-data for the container is created and, in step 121, stored in a meta-data catalog, such as MCAT 7. The meta-data may be of the form shown in FIGS. 15a-15b, but it should be appreciated that many other forms of this meta-data are possible. The important elements of this meta-data include a container name, or other container identifier, and the physical resources assigned to the container. Then, in step 122, one or more of the physical resources assigned to the container are allocated or reserved for exclusive use in conjunction with the container.

In one implementation, only the archived physical resources are allocated or reserved, and the cache physical resources are not. In another implementation, all physical resources assigned to the container are allocated or reserved at this time.

In one implementation example, these steps occur responsive to a create container command issued by a client. In this example, the user only specifies a container name with the command. Thereafter, the steps shown in FIG. 16a are performed, transparently to the user.

Figure 16C:
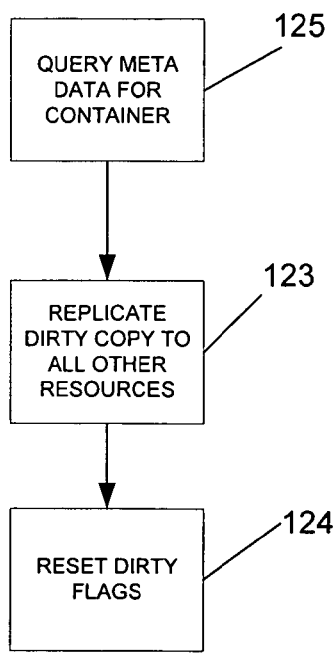
FIG. 16c illustrates a method of synchronizing a dirty copy of a container with one or more other copies in accordance with one embodiment of the subject invention.
Figure 16B:
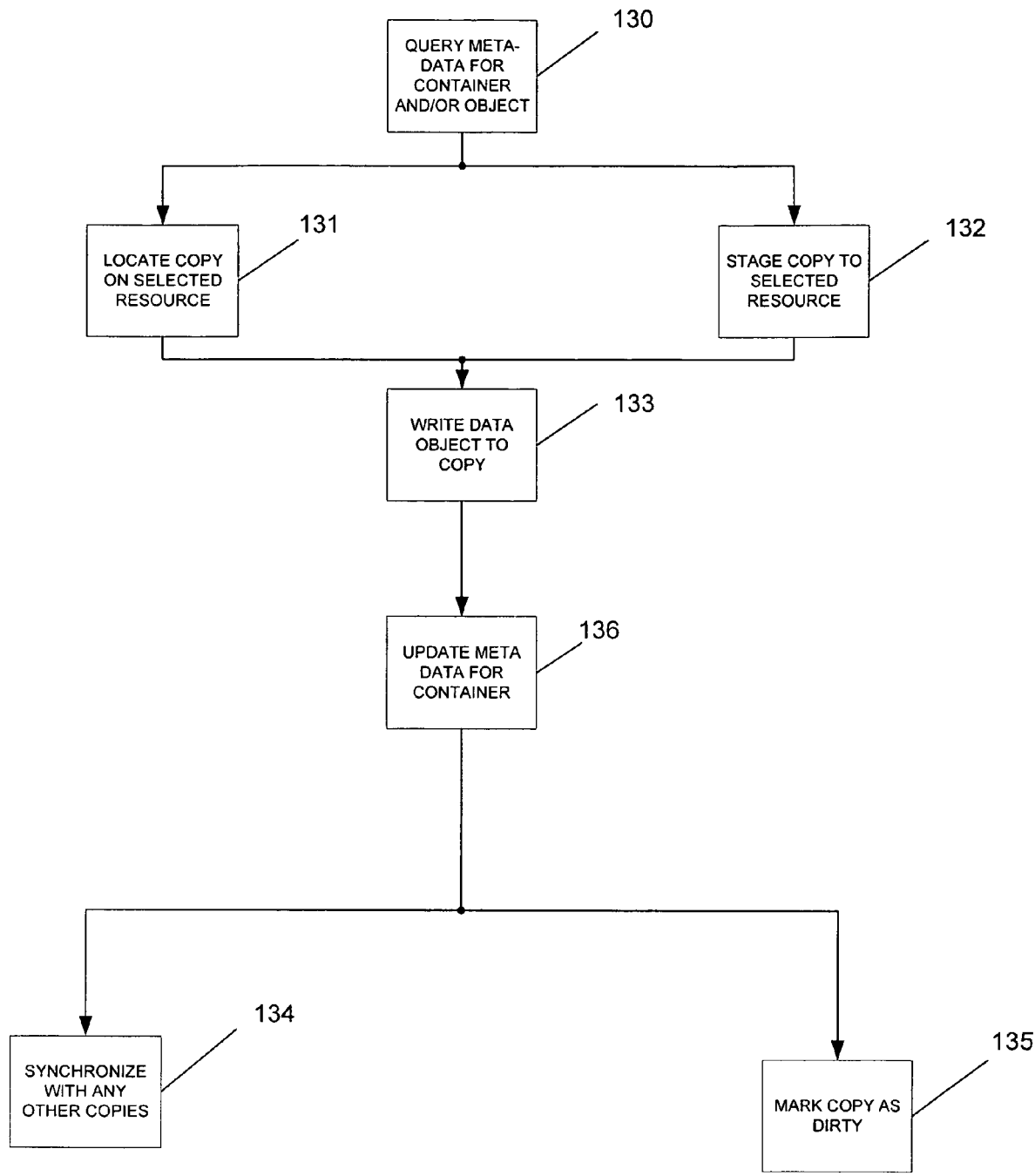
FIG. 16b illustrates a method of writing a data object into a container in accordance with one embodiment of the subject invention.

FIG. 16b is a flowchart depicting one embodiment of a method of writing a data object to a container in accordance with the subject invention. In step 130, the meta-data for the container is queried to determine the next available offset in the container, and also to determine the location of any copies of the container that may exist throughout the network. In addition, the meta-data for the object may also be queried in this step in order to determine the physical location of the object. Next, either step 131 or step 132 is performed. In step 131, a copy of the container is located on a selected one of the physical resources assigned to the container. If a copy is not present on the selected resource, step 132 is performed, whereby a copy of the container is staged to the selected resource from another one of the resources assigned to the container. In one implementation, the selected resource is a cache designated as the principal cache.

Next, step 133 is performed. In step 133, the data object is written into the copy of the container on the selected resource at the next available offset for the container (obtained in step 130). In one implementation, the data object is written into a copy of the container maintained on the principal cache. Next, step 136 is performed. In step 136, the meta-data for the container is updated to reflect the changes made to the container. Finally, either step 134 or step 135 is performed. In step 134, the copy of the container on the selected resource is synchronized with any other copies that may be present on the network. In the alternative, step 135 is performed, in which the copy of the container on the selected resource is marked as dirty. In this alternative, it is assumed that a subsequent synchronization operation will be performed, either initiated by a user, or initiated automatically by the system.

In one implementation, the user executes a write command specifying a container name and data object name. The system then performs the foregoing steps, transparently to the user, using the meta-data describing the container, and the copies thereof that may be present across the network, and also the meta-data describing the data object.

FIG. 16*c* is a flowchart illustrating one embodiment of a method of synchronizing containers in accordance with the subject invention. According to this embodiment, in step 125, the meta-data for a container is queried to determine the physical location of any copies of the container that may exist across the network, and also the location of any copies of the container that are marked as dirty. In one implementation, the meta-data is used to identify any cache copies of the container that are marked as dirty.

In step 123, the dirty copy of the container, if located, is copied to one or more of the other physical resources assigned to the container, and the dirty flag for each of these other copies is then set, thus indicating that the copies are now dirty. In one implementation, this step comprises copying a cache copy of the container marked as dirty to one or more archives assigned to the container which are not marked as dirty. In this implementation, client requests are processed using a cache copy of the container, and only one cache copy of the container can be marked as dirty at a time. Therefore, the dirty flag for a cache copy, if set, indicates that the cache copy is the only up-to-date copy of the container on the network. In this implementation, the cache copy of the container marked as dirty is copied to all of the archival resources assigned to the container that are not marked as dirty, and archived copies marked as dirty are left unchanged, it being assumed that these copies are up to date. In an alternate implementation, the cached copy marked as dirty is copied to all of the other physical resources assigned to the container.

In step 124, one or more of the dirty flags associated with the copies are reset. In one implementation, the dirty flag of any cache copy marked as dirty is reset, and, if all of the archived copies have been written over with the updated information, the dirty flags of all the archived copies are reset. However, if only some of the archived copies have been written over with the updated information, then the dirty flags for the copies that have been written over are kept in the set condition. In an alternate implementation, it is assumed that all other copies of the container are written over as part of the synchronization operation. Consequently, in this alternate implementation, during step 124, all dirty flags for the copies are reset.

In one implementation example, the synchronization operation is initiated through a command issued by a client. The command may include as an argument a purge flag. If the purge flag is set, then, at the conclusion of the synchronization process, cache copies of the container are purged, while, if the purge flag is reset, the cache copies are retained.

Figure 16D:
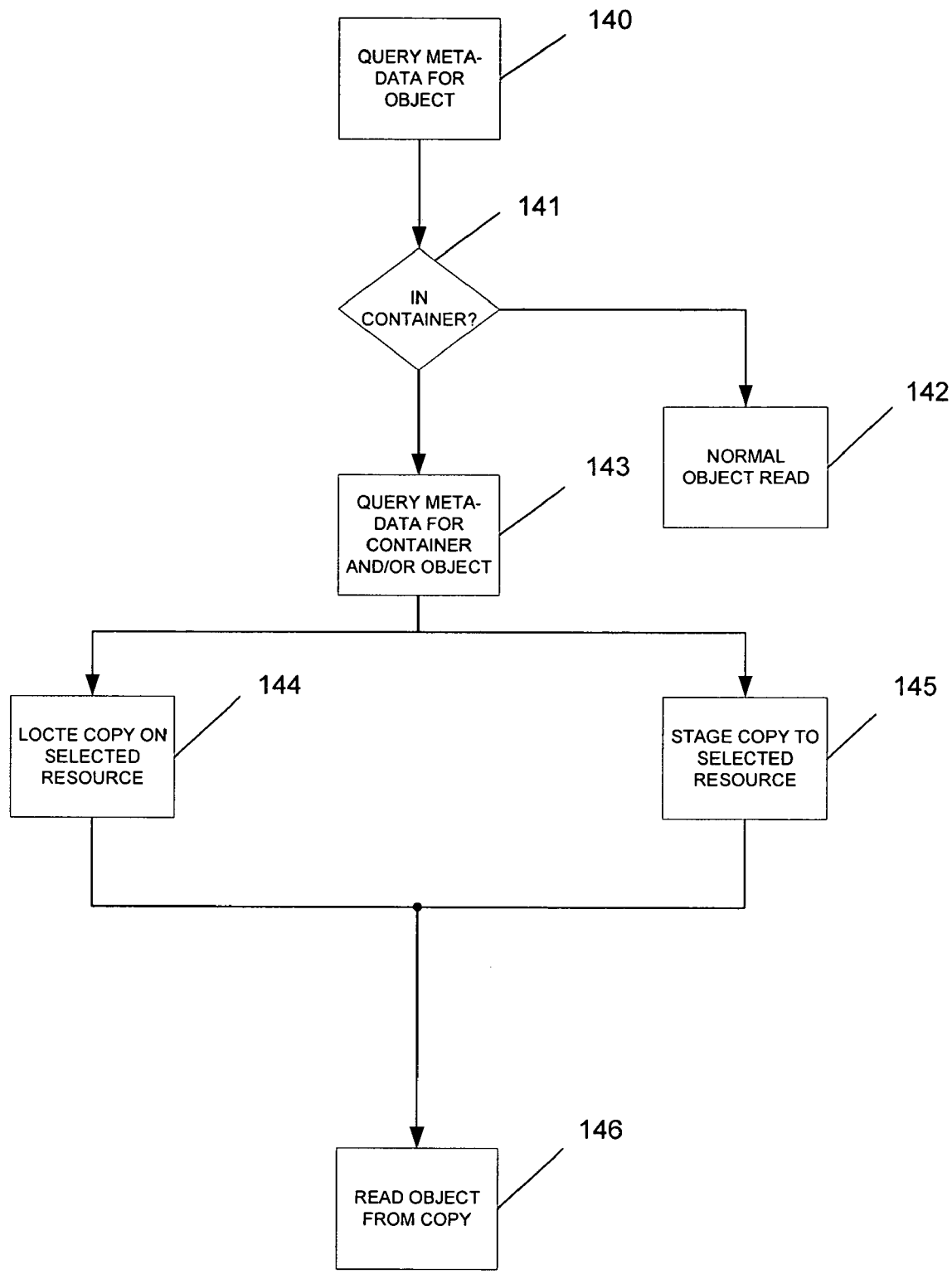
FIG. 16d illustrates a method of reading a data object from a container in accordance with one embodiment of the subject invention.

FIG. 16*d* is a flowchart illustrating one embodiment of a method of reading a data object from a container. In step 140, the meta-data for the object is queried to determine if the object is located in a container or not. If not, step 142 is performed, comprising a normal object read. If so, step 143 is performed. In step 143, the meta-data for the container is queried to determine the physical location of all copies of the container that may exist across the network. In addition, the meta-data for the object is queried to determine the offset of where the data object is stored within the container.

Next, either step 144 or step 145 is performed. In step 144, a selected resource is examined to determine if an up to date copy of the container. If a copy is not present, step 144 is performed. In step 144, a copy of the container is staged from one of the resources where it is present to the selected resource.

In one implementation, the selected resource is a cache resource designated as a principal cache resource. In this implementation, in step 144, the principal cache is examined to see if a copy is present. If not, step 145 is performed. In step 145, a copy of the container is staged to the principal cache from an archival resource designated as a principal archival resource.

After one or the other of steps 144 and 145 have been performed, step 146 is performed. In step 146, the data object is read from the copy on the selected resource and then provided to the client that initiated the request.

From the foregoing, it should be appreciated that the concept of "transparency" for purposes of the subject invention is a flexible concept that depends on the circumstances. In particular, it should be apparent that the concept embraces situations in which the underlying details of containers are not entirely invisible to the user depending on the command involved. For example, during the process of creating a container, the user, who could be a system administrator rather than an end user, might need to be intimately familiar with the underlying details of a container in order to properly establish the meta-data for the container. However, during subsequent read operations to the container, the user, who might be an end user rather than a system administrator, need not know the container name in order to execute the operation.

III. Implementation Example

Due to the relatively high overhead of creating/opening files in archival storage systems such as HPSS, such systems are generally not suitable for storing large number of small files typically found in digital library systems. In one implementation example, the container concept was specifically designed to circumvent this type of limitation. The idea is through the use of containers, many small files can be aggregated before storage in the archival storage system.

In this implementation example, a data object stored in a container is referred to as an inContainer object, and the meta-data for translating an inContainer object to file path, offset and size are kept in the MCAT and the SRB I/O drivers have been adapted to handle inContainer objects.

Each container is assigned a logical resource, and one or more physical resources are assigned to the logical resource. A physical resource is an underlying storage resource maintained on the SRB system. In general, at least two categories of physical resources are supported: archival and cache.

Figure 13:
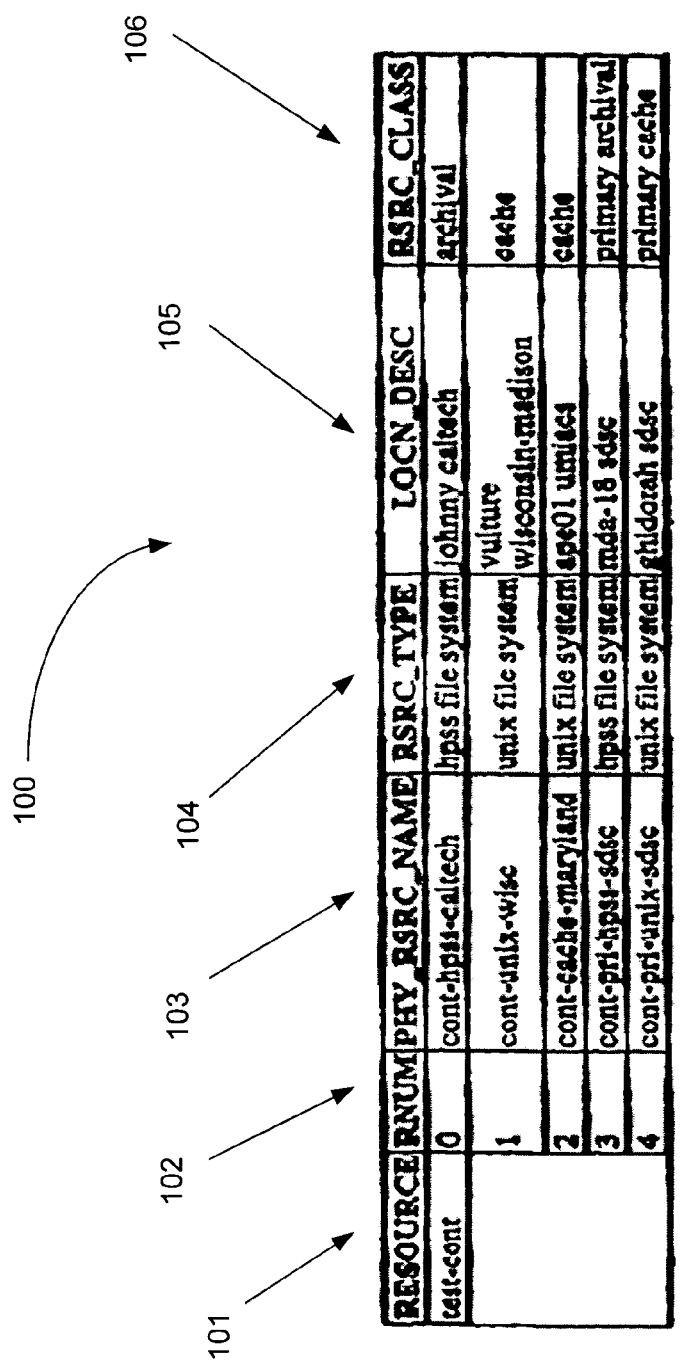
FIG. 13 illustrates an implementation example of meta-data describing the physical resources associated with a logical resource in accordance with the subject invention.

An example of meta-data 100 describing the physical resources associated with the logical resource assigned to a container is illustrated in FIG. 13. Item 101 is the name of the logical resource (which also appears as item 83 in FIG. 11); and items 102-106 describe each of the physical resources assigned to the logical resource. For each physical resource, item 102 is a consecutive number identifying the resource; item 103 is the name of the resource; item 105 is the location of the resource (host address and the path (for file system type resource) or DB schema/table name (for DB large objects) for the SRB vault); item 104 is the type of resource (UNIX file system, HPSS file system and DB large object, etc.; and item 106 is the class of the resource. At present, four classes are supported: archival, cache, primary archival, and primary cache. The SRB servers 3 use this information to determine which driver to use to communicate with the resource.

The logical resource used to create a container should contain at least one archival physical resource (e.g., HPSS) and may contain at least one cache physical resource (e.g., UNIX disk file system). A copy of a container in cache can be purged while a copy in archival storage cannot be. Multiple cache physical resources and multiple archival physical resources can be associated with a logical resource, but one and only one cache resource can be designated as primary, and only one archival resource can be designated as primary.

The following software is provided in this implementation example to support containers:

1) The four APIs: srbContainerCreate(), srbRmContainer (), srbGetContainerInfo() and srbSyncContainer() to respectively create, remove, and query container info and also to synchronize copies of a container. Apart from these, file operations such as read, seek, write, close, open are supported on objects in containers.

2) The four command line utilities: Smkcont, Srmcont, Ssyncont and Slscont to respectively create, remove, sync and list meta-data of container. The Slscont command provides a listing of all containers owned or accessible by a user as well as a listing of all inContainer objects stored in a given container. Apart from these, Sget, Sput, Scat and Srm, are provided as utilities to access and create objects in containers.

A. Storing Objects in Containers

When a client wishes to store objects in a container, a three-step process is performed. In the first step, a container is created. In the second step, a cache copy of the container is located, and the location in the cache copy where the object is to be stored is determined. In the third step, the object is written into the cache copy at the specified location.

To create a container, a client initiates a srbContainerCreate() call specifying the name of the container to be created and the logical resource (or resource group) to be used for creating the container. In response, the SRB system creates meta-data in the meta-data catalog describing the container. Based on the results of the query, the SRB server determines the cache copy and location of the cache copy where the object will be stored. The SRB server then opens the cache copy and returns an SRB file descriptor for storing the object in a cache copy of the container. Finally, the client initiates an srbObjWrite() call specifying the SRB file descriptor. In response, the SRB server writes the data into the cache copy of the container.

Figure 11:
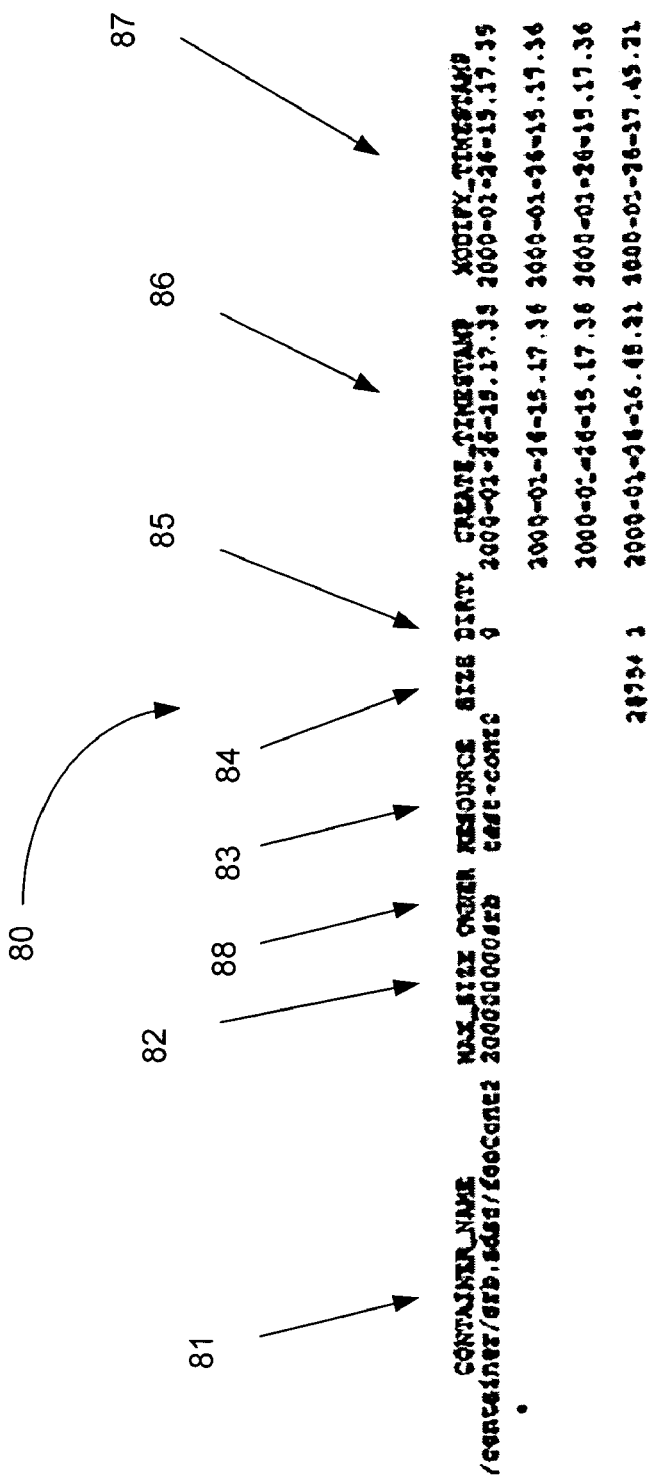
FIG. 11 illustrates an implementation example of meta-data describing a container in accordance with the subject invention.

An example of meta-data 80 describing a container is shown in FIG. 11. Item 81 is the container name; item 82 is the maximum size of the container; item 83 is the logical resource associated with the container; and items 84-87 describe each of the container copies.

For each such physical resource, item 84 is the size of the container copy; item 85 is a "dirty" flag indicating whether or not the data in the physical resource is the most current version of the container; item 86 is a timestamp indicating the time of creation of the copy of the container in the physical resource; and item 87 is a timestamp indicating the time of modification of the copy of the container in the physical resource. Note that these latter two items will be different only for physical resources in which are stored dirty copies of the container.

The SRB server, upon receiving the request, creates the required meta-data (e.g., container name, logical resource, user name, etc) in the MCAT for the container and also reserves zero length files with unique path names in the archival resources where copies of the container will be stored.

Figure 5:
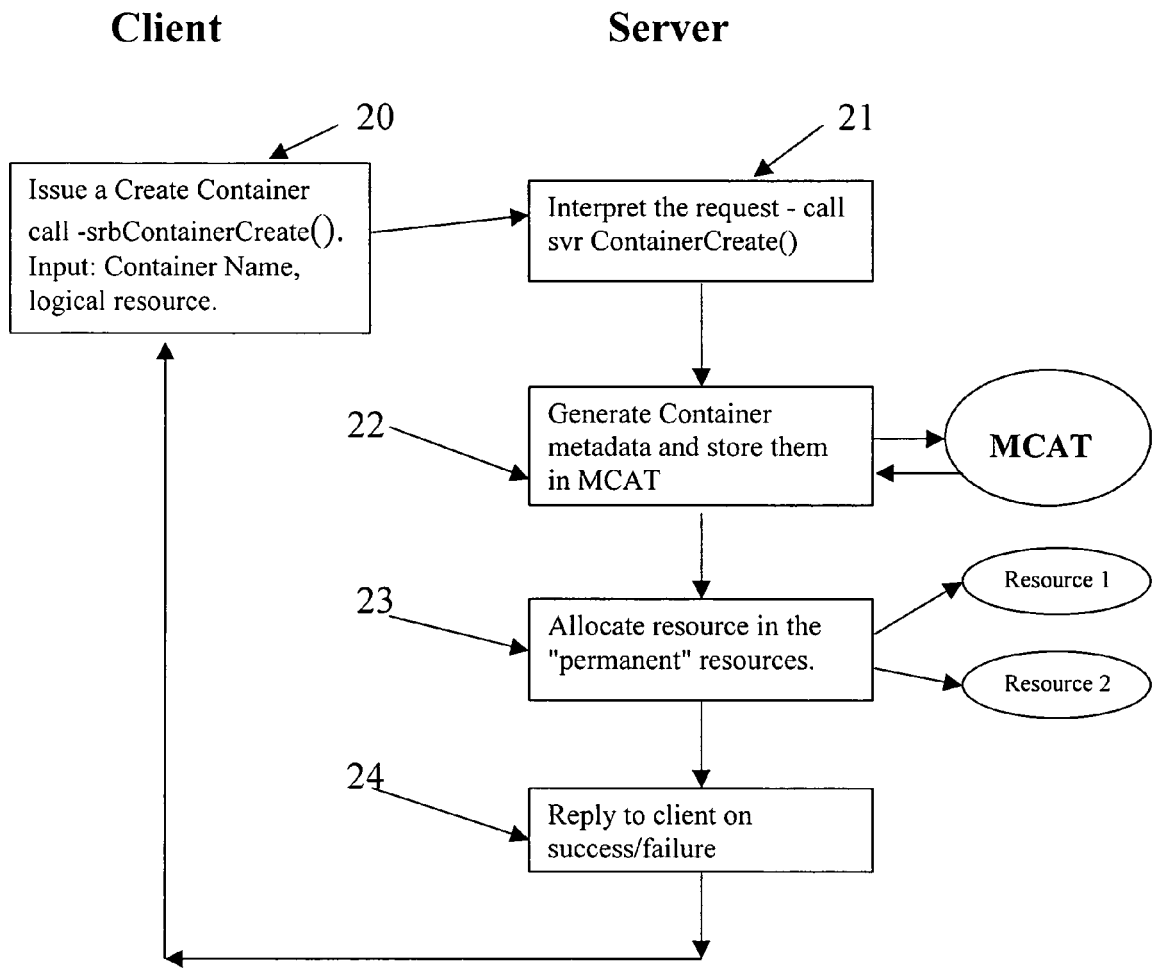
FIG. 5 illustrates an implementation of a method of container creation in accordance with the subject invention.

FIG. 5 illustrates the process of creating a container in this implementation example. As illustrated, in step 20, the client issues a srbCreateContainer call. In step 21, an SRB server interprets the request, and in step 22, generates the meta-data describing the container, and stores such in the MCAT. In step 23, the server reserves files in the archival resources assigned to the container, and, in step 24, replies to the client on the success or failure of the request.

Once a container has been created, data objects can now be imported into the container. From a client standpoint, a container is uniquely identified by its name. The srbObjCreate() call for normal object creation can be used to put data objects into a container. The only difference is that an additional condition with keyword "CONTAINER" should be used to specify the name of the container to be used for storing the data object. As previously discussed, objects that are stored in containers will be referred to as "inContainer" objects.

Figure 6:
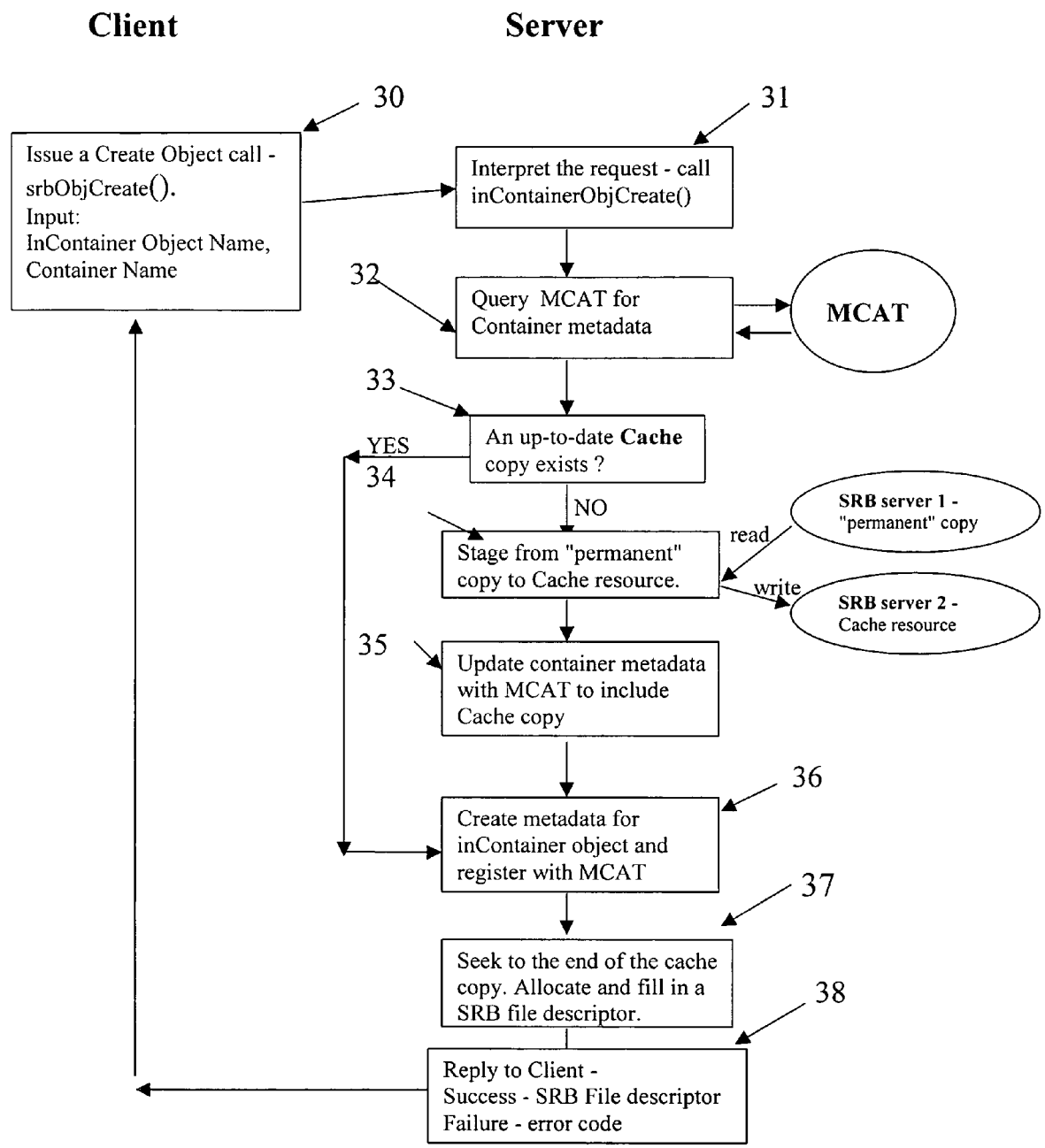
FIG. 6 illustrates an implementation of a method of importing objects into a container, including creating an object in a container, in accordance with the subject invention.

FIG. 6 illustrates the process of importing an object into a container in this implementation example. In step 30, the client issues a srbObjCreate() call. In response, the SRB server will perform the following steps:

1) In step 31, the request is interpreted.

2) In step 32, the MCAT is queried for meta-data associated with the container. As previously discussed, container meta-data specifies the container logical resource, all physical resources associated with the logical resource, the type (UNIX file system, HPSS system, DB large objects, etc) and class ("archival", "cache", "primary", etc) associated with each physical resource, whether a current copy of the container is stored on the physical resource, etc.

Figure 12:
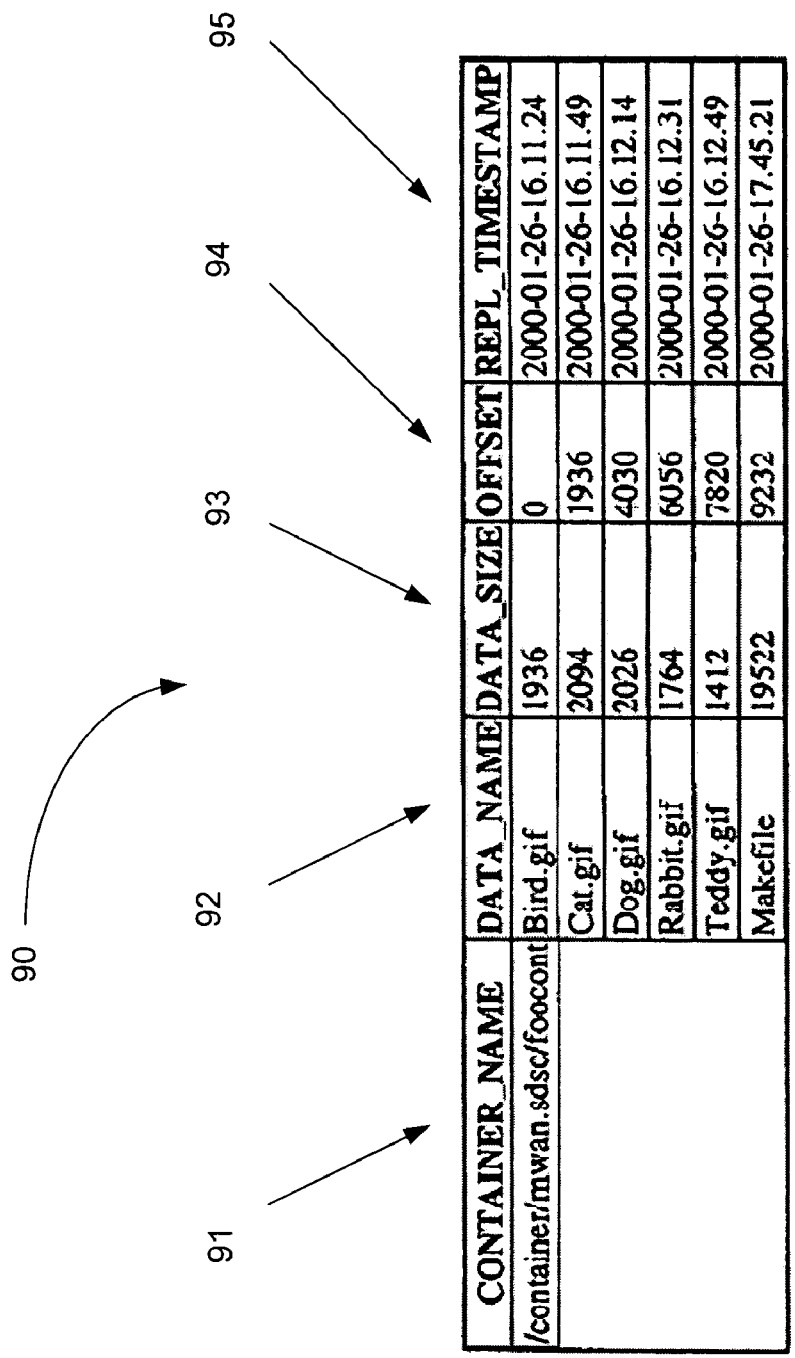
FIG. 12 illustrates an implementation example of meta-data describing the data objects in a container in accordance with the subject invention.

3) In step 33, a query is made whether an up-to-date cache copy of the container exists. If so, step 36 is performed. In step 36, the SRB server creates in the MCAT the meta-data for the inContainer object being created. Meta-data for inContainer objects includes the meta-data normally created for objects plus some meta-data that is container specific, such as the container name and offset where the object is to be stored. An example of inContainer object meta-data 90 is illustrated in FIG. 12. The data includes item 91, the container name; and, for each data object in the container, item 92, the name of the data object; item 93, the size of the data object; item 94, the offset in the container where the data object is stored; and item 95 is the timestamp when the object is created.

4) By default, all I/Os are done to a cache copy of the container. If a cache copy does not exist (all purged), in step 34, the SRB server will first attempt to stage a copy of the container from the primary archival resource to the primary cache resource. If the primary archival copy is not available (system or device down), other archival copies will be used to perform the staging operation. Similarly, if the primary cache copy is not available, other cache resources assigned to the same logical resource will be used to perform the staging operation. It should be noted that the whole container copy is staged rather than individual portions of or data objects in the container.

5) Once a "cache" copy has been found or staged, the SRB server, in step 37, issues an "open" operation to the "cache" copy and then a "seek" operation to the end of file. That will be the starting point for a subsequent write operation to actually place the object in the container.

6) In step 38, an SRB file descriptor in the form of an integer is then returned from the SRB server to the client. The client can then use this descriptor to issue a write call (srbObjWrite()) to write the data into the container.

Figure 7:
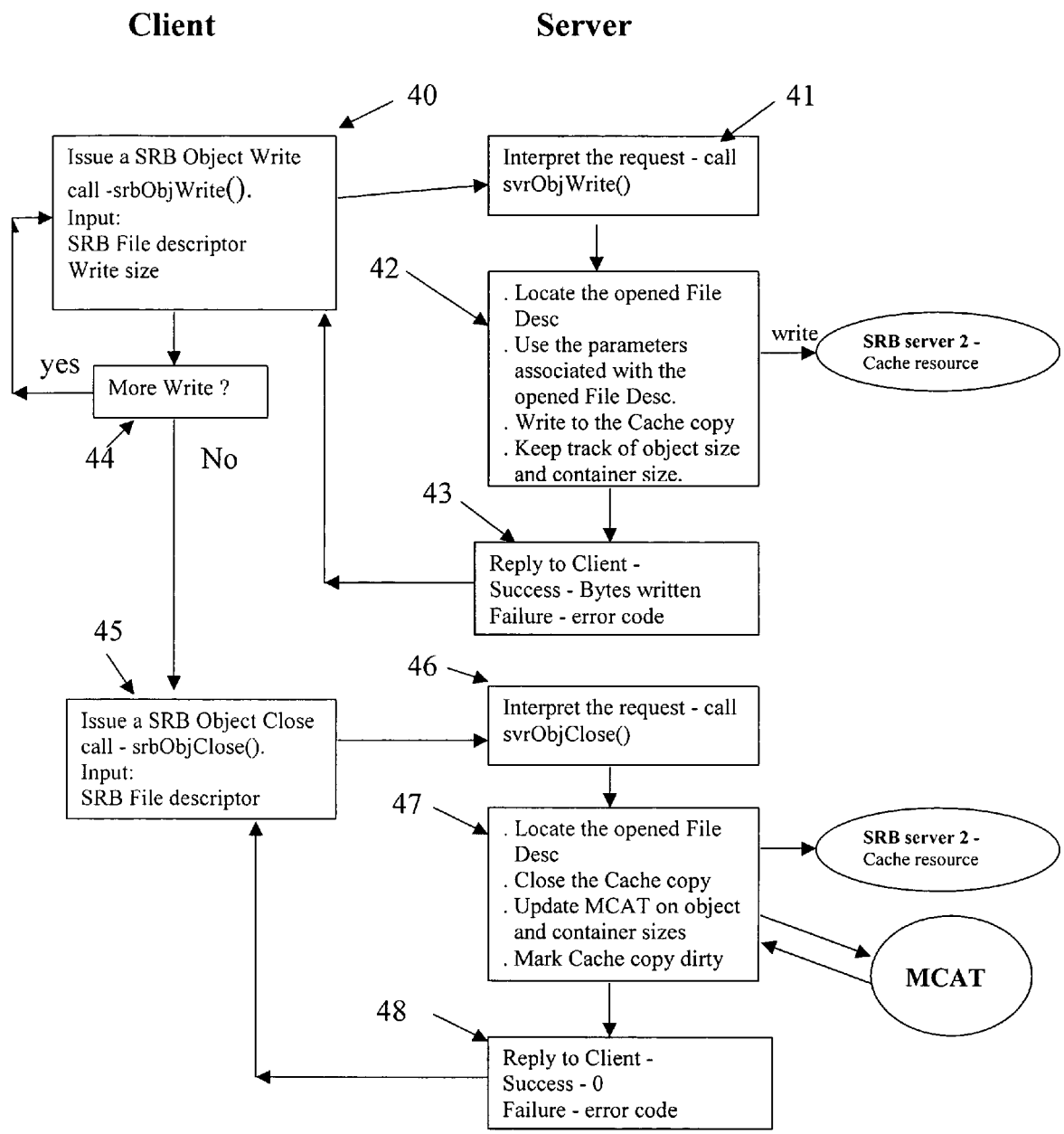
FIG. 7 illustrates an implementation of a method of importing objects into a container, including writing data objects into a pre-existing container, in accordance with the subject invention.

FIG. 7 illustrates the process of writing one or more data objects into a cache copy of the container in this implementation example. In step 40, the client initiates an srbObjWrite() call specifying an SRB file descriptor, an input buffer, and the number of bytes to be written into the container. In response, the SRB server performs the following steps:

1) In step 41, the request is interpreted.
2) In step 42, the opened cache file descriptor is located, and the input buffer is written at the location specified by the SRB file descriptor.
3) In step 43, the server issues a reply to the client, indicating whether or not the write operation was successful. The client then repeats the foregoing process for each of the data segments to be stored. At each step of the way, the location at which a write takes place is updated from the previous location by the size of the object which has just been stored, keeping in mind that the write location can never exceed the size of container file.
4) When the client, in step 45, finishes writing data and issues an srbObjClose() call to close out the I/O, the SRB server, after intepreting the call in step 46, will, in step 47, close the opened container file, update the offset and size meta-data for the inContainer object, and mark the container copy as "dirty".
5) In step 48, the server replies to the client indicating success or failure for the overall operation.

It should be noted that all the above complex operations performed by the server are totally hidden from the client, as the client only needs to supply the name of the container where the inContainer object is to be created. Moreover, a client can use the srbSyncContainer() call (described later) to synchronize a modified (dirty) cache copy to the archival resource.

When the container is full (max container size exceeded), the SRB server automatically renames the full container by appending a unique integer (clock in seconds) to the container name and creates a new container with the original name. This way, the client does not have to worry about filling up containers. Having a limit on container size is needed because of the finite space in the "cache" resource.

B. Synchronizing Copies of Containers

Figure 8:
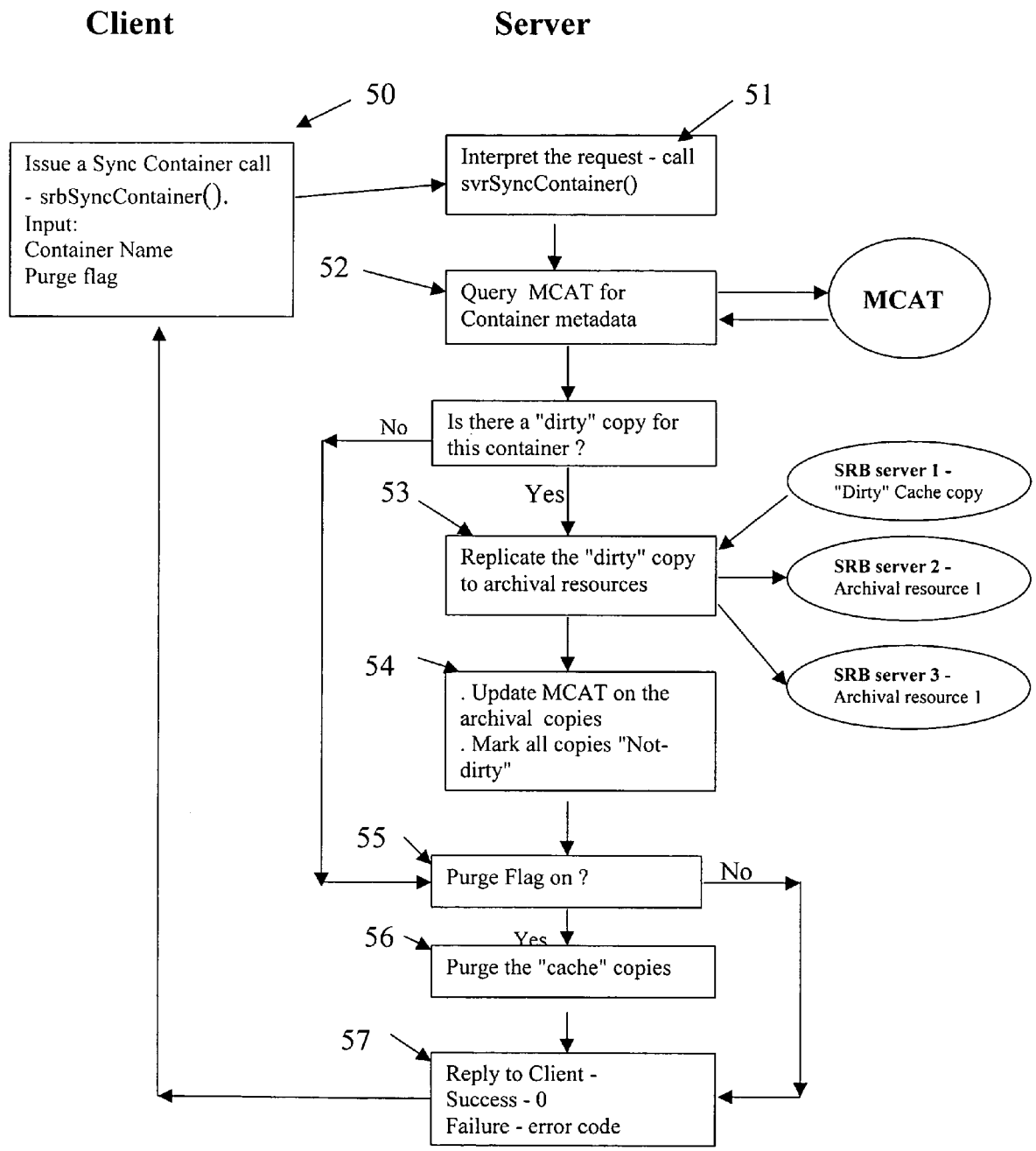
FIG. 8 illustrates an implementation of a method of synchronizing copies of a container in accordance with the subject invention.

FIG. 8 illustrates the process of synchronizing copies of a container. In step 50, the client initiates a srbSyncContainer() call specifying a container name and a purge flag. Responsive thereto, an SRB server performs the following steps:

1) In step 51, the request is interpreted.
2) In step 52, the MCAT is queried for the container meta-data.
3) The container meta-data is then queried to determine if a "dirty" cache copy of the container exists.
4) If so, in step 53, the "dirty" copy is replicated to one or more archival resources associated with the container that are marked as "not dirty".
5) Then, in step 54, if all archival copies of the container have been written over, the archival copies and the cache copy are marked as "not dirty," but, if some but not all of the archival copies have been written over, marking the archival copies and keeping the cache copy marked as "dirty."
6) In step 55, querying whether the purge flag is on, and if so, in step 56, purging the cache copies of the container.
7) In step 57, replying to the client, indicating whether the synchronization operation was successful or not.

C. Reading Objects from Containers

Once a container has been created, a client can use the srbObjOpen() call (used for normal object open) without modification to open inContainer objects for I/O operations such as read and write. The client does not need to be aware of whether an object is stored in a container because the information is already in MCAT. The srbObjOpen() call returns an SRB file descriptor specifying the offset where the object is stored in a cache copy of the container. The client then issues an srbObjRead() call specifying the SRB file descriptor which returns a copy of the object to the client.

Figure 9:
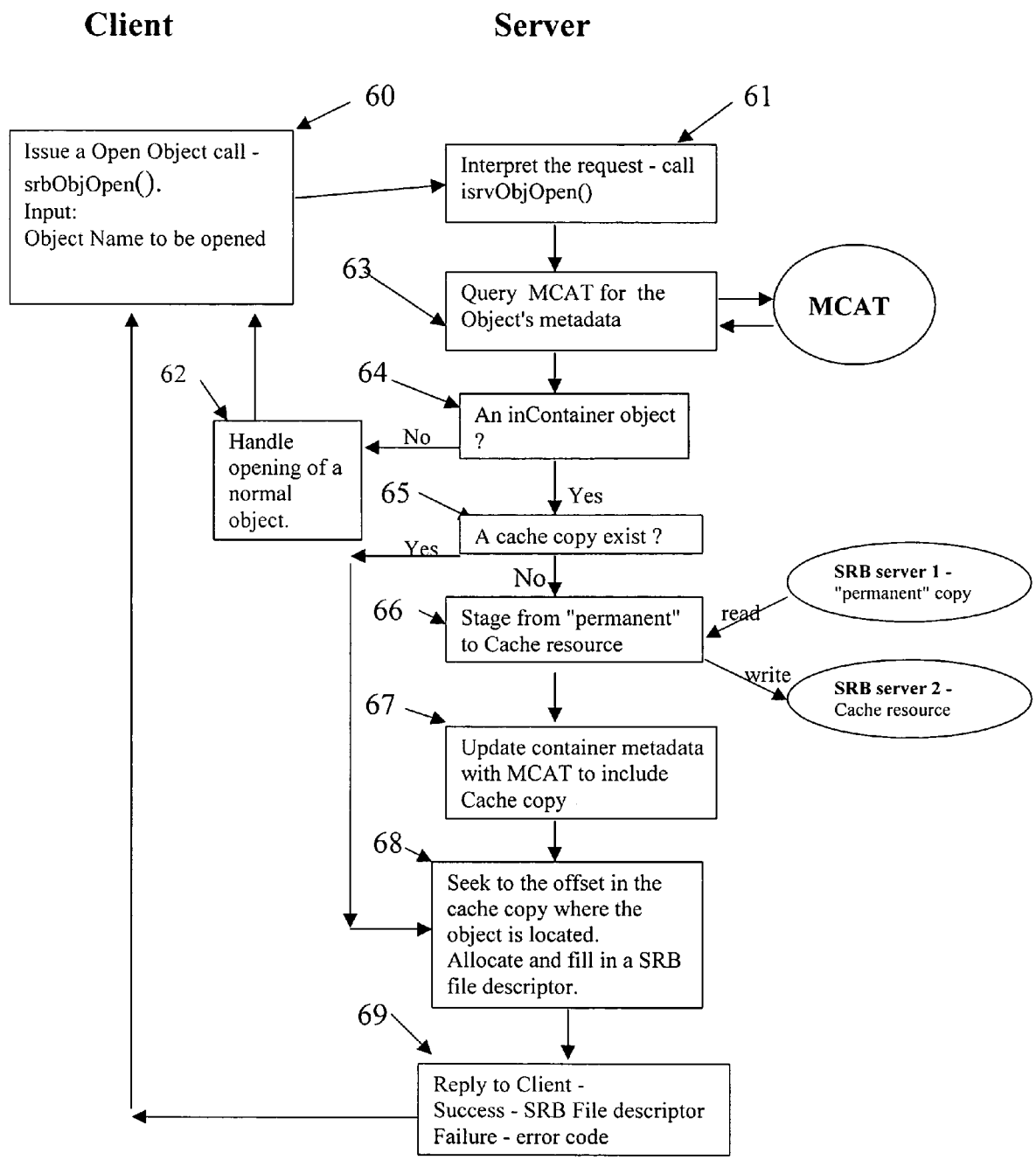
FIG. 9 illustrates a first implementation of a method of reading data objects in a container in accordance with the subject invention.

The process of opening the inContainer object is illustrated in FIG. 9. As illustrated, in step 60, the client issues a srbObjOpen() call specifying the object name to be opened. In response thereto, the SRB server will perform the following steps:

1) In step 61, interpreting the request.
2) In step 63, query MCAT for the meta-data associated with the object. If the object is an inContainer object, the MCAT is further queried for meta-data associated with the container.
3) In step 64, query whether the object is an inContainer object. If not, step 62, normal object opening, is performed. If so, jump to step 65.
4) By default, all I/Os are done to the container copy on the "cache" type resource. In step 65, a query is made whether a "cache" copy exists. If a "cache" copy does not exist (all purged), the SRB server, in step 66, will first attempt to stage the container from the primary archival resource to the primary cache resource. Other resources will be used if the primary resources are not available at the time. In step 67, the container meta-data is updated to reflect the cache copy which was staged.
5) Once a "cache" copy is found or staged, the SRB server, in step 68, issues an "open" operation to the "cache" copy and then a "seek" operation to the offset location where this object is located. This will be the starting point for all subsequent write operations associated with this inContainer object.

6) In step 69, an object descriptor in the form of an integer will then be returned from the SRB server to the client. The client can then use this descriptor to issue read calls (srbObjRead()) to read data from the container.

Figure 10:
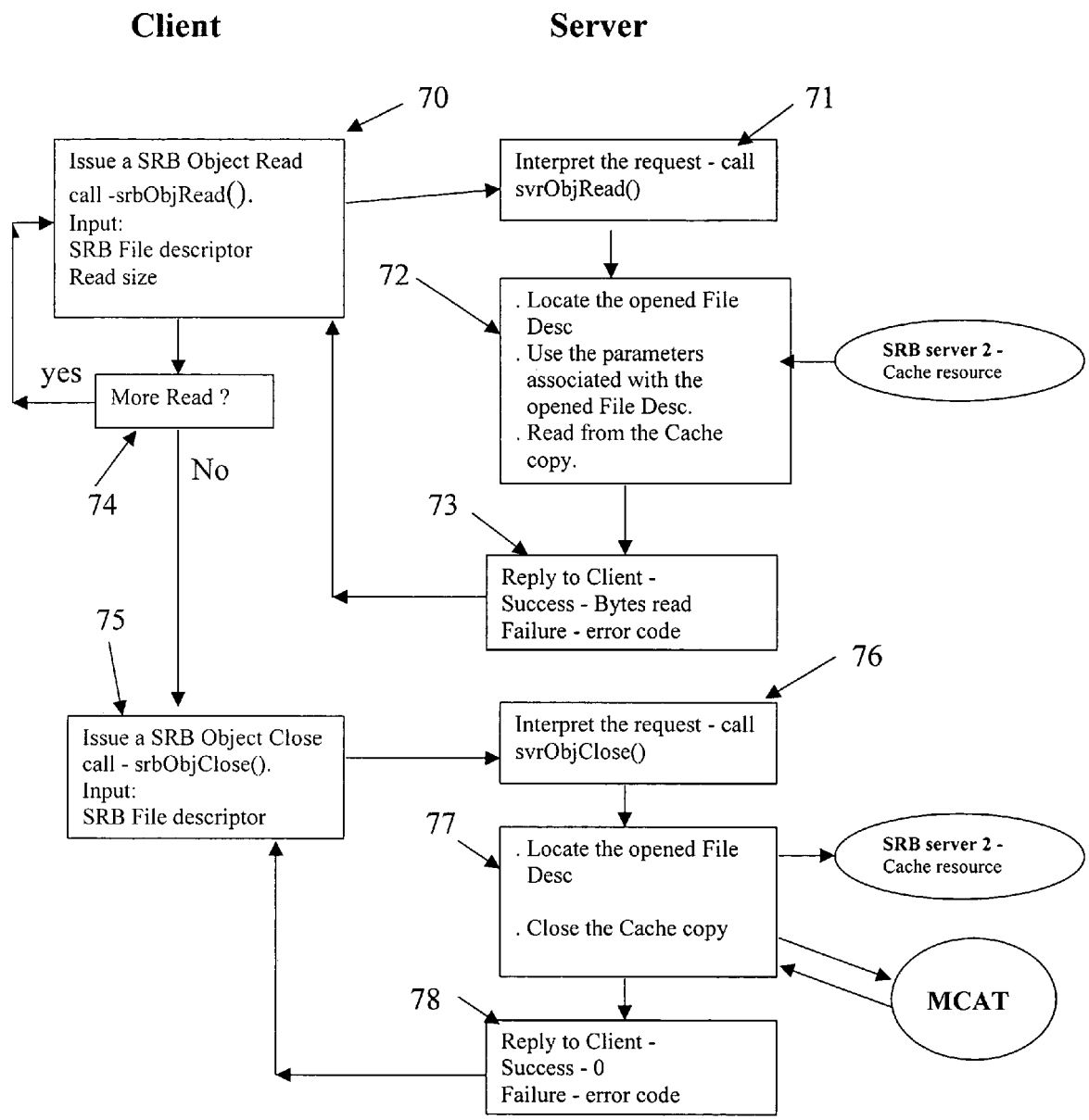
FIG. 10 illustrates a second implementation of a method of reading data objects in a container in accordance with the subject invention.

The process of reading an object from the container is illustrated in FIG. 10. In step 70, the client issues an srbObjRead() call specifying an SRB file descriptor and the number of bytes to be read. In response thereto, the SRB server performs the following steps:

1) In step 71, interpreting the request.
2) In step 72, locating the opened cache file, and reading the object therefrom.
3) In step 73, replying to the client, indicating whether the operation was successful or not. In step 74, the client determines whether additional data are to be read, and if so, the foregoing steps are repeated for the additional data.
4) When the client finishes reading data and, in step 75, issues an srbObjClose() call to close out the I/O, the SRB server, after interpreting the request in step 76, will, in step 77, close the opened container file.
5) In step 78, the server replies to the client, indicating success or failure.

EXAMPLE APPLICATIONS

A number of applications of the SRB, and in particular, containers in an SRB environment, are possible. Some of these applications include the following:

1) Consolidation/integration of databases across an enterprise—an enterprise such as a corporation might have heterogenous accounting systems in different divisions and/or subsidiaries which may even be located in different countries. The SRB with containers would enable data from these heterogenous systems to be consolidated/merged to produce consolidated financial statements. Data for a single division or subsidiary, which may be maintained in multiple databases, could all be placed in a single container for the division or subsidiary.
2) Maintenance of hospital/medical records across multiple facilities—an SRB with containers would provide a vehicle for managing digital images of hospital/medical records across multiple facilities. The medical records/information for a single patient, which typically would be distributed across multiple facilities, could be placed into a container for the patient.
3) Inventory control and procurement—a manufacturer such as an automobile manufacturer maintains inventory from a number of suppliers. Each of the suppliers might maintain a database indicating the price and availability of the components provided by the supplier. An SRB with containers would provide a mechanism for the manufacturer to perform inventory management and procurement using the data in these multiple heterogenous databases. The data for a particular product or component, which may be represented in the databases of multiple suppliers, could be maintained in a container for the product or component.
4) B2B Applications—many Business to Business (B2B) applications currently contemplated as involving the Internet could be implemented through an SRB with containers. Consider, for example, an auction system for bringing together multiple buyers and sellers of a particular product. In this system, each of the sellers would provide a database describing product pricing and availability, and each of the buyers would be represented by a client communicating desired product pricing and availability. The auction system would provide a clearinghouse for these buyers and sellers. Such a system could be implemented over the Internet with an SRB with containers. The data for a particular product or component, which may be represented in the databases of multiple sellers, could be maintained in a container for the product or component.
5) Stock portfolio management—an investor might wish to manage investments in different asset classes, e.g., individual stocks, mutual funds, etc., through accounts maintained with different brokers and institutions. Each of the brokers and institutions might maintain a separate database for the investor. An SRB with containers would provide a mechanism for managing the data from these diverse databases. The data for a particular investor across all these databases could be placed into a container for the investor.
6) Genomics/drug research—genetic data such a gene or protein sequences for a particular organism might be maintained in multiple, heterogenous databases. An SRB with containers would provide a mechanism for managing this data. All the data for a particular organism across all these data sources could be placed into a container for the organism.
7) Law enforcement—an SRB with containers would provide a mechanism for sharing information across jurisdictional boundaries. All the information for a particular crime or crime suspect, across all the jurisdictional boundaries, could be placed in a container for the crime or crime suspect.
8) Government applications—a government agency might maintain a plurality of diverse databases containing information relating to a particular individual. For example, the IRS might maintain information regarding current and past tax returns for an individual on multiple current or archival databases. An SRB with containers could provide a mechanism for managing the data in these multiple databases. All the data for a particular individual could be maintained in a container for the individual.

While embodiments, implementations, and examples have been shown and described, it should be apparent to one of ordinary skill in the art that there are many more embodiments, implementations, and implementation examples that are within the scope of the subject invention. Accordingly, the invention is not to be restricted, except in light of the appended claims and their equivalents.

What is claimed is:

1. A method for transparently managing containers in a network of distributed physical resources, a container comprising a plurality of data objects and an association of the plurality of data objects with a plurality of physical resources in the network assigned to the container at which the container may be stored or copied, comprising:

issuing a request to write one or more data objects in or to a container in response to a user command;

accessing a meta-data catalog in response to the request, the meta-data catalog associating the data objects in the container with the plurality of physical resources assigned to the container, including querying meta-data about the container;

locating on or staging to a selected physical resource a copy of the container, including copying a container from one physical resource to another assigned to the container transparently to the user should a staging condition arise;

writing the data object to the copy of the container;

synchronizing the copy with any other copies that may be present in the system, or making the changed copy for synchronization, transparently to the user should an out-of-synchronization condition arise; and updating the meta-data catalog to reflect changes incidental to the request, including updating the meta-data for the container to reflect the write operation.

2. The method of claim 1 wherein the meta-data for a container associates at least one cache resource and at least one archival resource with the container.

3. The method of claim 2 further comprising generating, responsive to a request to create a container, meta-data for the container;

associating one or more physical resources with the container;

storing the meta-data in a meta-data catalog; and allocating one or more of the physical resources to the container.

4. The method of claim 2 wherein:

the step of querying meta-data about the container includes obtaining a next available offset for storing in or to the container; and the step of writing one or more data objects to the copy of the container comprises writing the one or more data objects beginning at the next available offset.

5. The method of claim 2 further comprising querying, responsive to a request to synchronize copies of a container, meta-data for the container to locate a copy of the container mark by the synchronization;

overwriting one or more of the other copies of the container with the dirty copy; and resetting the dirty status of one or more of the copies of the container.

6. The method of claim 2 further comprising querying, responsive to a request to read a data object or part of an object as specified by a method or parameter, from a container, mete-data for the container, including an offset for the object within the container;

locating on or staging to a selected physical resource a copy of the container; and reading the required data from the copy at the specified offset.

7. The method of either of claims 1 or 6 wherein the selected physical resource comprises a primary cache resource.

8. The method of claim 1 wherein the plurality of physical resources is selected front the group comprising a file system, an archival storage system, a cache system, and a database system.

9. The method of claim 1 wherein the plurality of physical resources is selected from the group comprising object-oriented, relational, structured, and semi-structured systems.

10. The method of claim 1 further comprising receiving a request front a client and responsive thereto, spawning a broker process, executable on a server, for responding to the request.

11. The method of claim 1 further comprising the meta-data associating at least one archival resource with the container.

12. The method of claim 1 further comprising staging a copy of the container to a cache assigned to the container in response to a container read or write request upon determining that the data objects in the container are not stored in the cache.

13. The method of claim 1 further comprising synchronizing multiple copies of the container in response to a container write operation performed on a copy of the container stored in a cache assigned to the container.

14. The method of claim 1 further comprising marking for synchronization at least one copy of the container as stored ma cache assigned to the container in response to a container write operation performed on a copy of the container stored in the cache.

15. The method of claim 1 further comprising purging at least one copy of the container in response to a purge condition.

16. The method of claim 15 further comprising purging any cache copies of the container after synchronizing multiple copies of the container including at least one archival copy.

17. The method of claim 1 wherein the data objects in the container are unstructured.

* * * * *